United States Patent
Kato

(10) Patent No.: US 6,869,470 B2
(45) Date of Patent: Mar. 22, 2005

(54) INK SET FOR INK JET RECORDING AND INK JET RECORDING PROCESS

(75) Inventor: Shinichi Kato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/351,959

(22) Filed: Jan. 27, 2003

(65) Prior Publication Data

US 2004/0020406 A1 Feb. 5, 2004

(30) Foreign Application Priority Data

Jan. 28, 2002 (JP) ..................................... P.2002-018184

(51) Int. Cl.⁷ .............................................. C09D 11/02
(52) U.S. Cl. .................. 106/31.6; 106/31.69; 106/31.7; 106/31.72; 106/31.82; 106/31.83; 106/31.84
(58) Field of Search ............................ 106/31.6, 31.69, 106/31.7, 31.72, 31.82, 31.83, 31.84; 347/100; 523/160

(56) References Cited

U.S. PATENT DOCUMENTS

| | | | | |
|---|---|---|---|---|
| 6,387,168 B1 | * | 5/2002 | Koitabashi et al. ........ | 106/31.6 |
| 6,395,079 B1 | * | 5/2002 | Sano ........................ | 106/31.59 |
| 6,419,733 B1 | * | 7/2002 | Sano et al. ............... | 106/31.86 |
| 6,602,333 B2 | * | 8/2003 | Miyabayashi ............ | 106/31.27 |
| 6,652,084 B1 | * | 11/2003 | Teraoka et al. ............. | 347/100 |
| 6,670,409 B2 | * | 12/2003 | Yatake ........................ | 523/160 |
| 2002/0041317 A1 | * | 4/2002 | Kashiwazaki et al. ...... | 347/100 |
| 2003/0048342 A1 | * | 3/2003 | Kashiwazaki et al. ...... | 347/100 |
| 2003/0103121 A1 | * | 6/2003 | Tomioka et al. ............ | 347/100 |
| 2003/0146962 A1 | * | 8/2003 | Ogasawara et al. ......... | 347/100 |
| 2003/0177942 A1 | * | 9/2003 | Yamazaki ................. | 106/31.27 |
| 2004/0020406 A1 | * | 2/2004 | Kato ......................... | 106/31.6 |
| 2004/0020407 A1 | * | 2/2004 | Kato ......................... | 106/31.6 |

* cited by examiner

*Primary Examiner*—Mark L. Bell
*Assistant Examiner*—Veronica F. Faison
(74) *Attorney, Agent, or Firm*—Ladas & Parry LLP

(57) ABSTRACT

The invention relates to an ink set for ink jet recording comprising at least one "self-dispersion type pigment ink containing water and a pigment dispersible in water without a dispersing agent" and at least one "light-color resin-containing pigment ink containing water and a pigment made dispersible in water with a resin, wherein the concentration of the pigment is one-half or less the concentration of the pigment contained in the self-dispersion type pigment ink". Also disclosed is an ink jet recording process for conducting ink jet recording using the ink set described above.

8 Claims, 6 Drawing Sheets

INK SET FOR INK JET RECORDING AND INK JET RECORDING PROCESS

FIELD OF THE INVENTION

The present invention relates to an ink set for ink jet recording and an ink jet recording process using the same, and particularly to an ink set for ink jet recording and an ink jet recording process, which can provide good image quality without depending on the type of paper (particularly, whether paper exclusive to ink jet recording or plain paper).

BACKGROUND OF THE INVENTION

Ink jet recording is a process of ejecting ink as small droplets through minute nozzles to record letters and figures on surfaces of recording media. The ink jet recording processes that have come in practice include a process of converting electric signals to mechanical signals with electrostrictive elements, thereby intermittently ejecting inks stored in nozzle head portions to record letters and figures on surfaces of recording media, and a process of rapidly heating inks stored in nozzle head portions at parts very close to ejection portions to generate bubbles, and intermittently ejecting the inks by volume expansion due to the bubbles to record letters and figures on surfaces of recording media.

As for feeding of inks in ink jet recording, a process of using an ink set in which a plurality of inks different in colors are combined has been known. Such an ink set has the advantage that the type and ejection rate of each ink ejected from the ink set are selected on demand according to signals based on image information, thereby being able to easily obtain high-quality color images.

In general, inks in which various water-soluble dyes are dissolved in aqueous media have been widely used as the inks contained in such an ink set. Recently, however, inks in which pigments are dispersed in aqueous media with dispersing agents have also been provided. This is because the inks using the pigments (hereinafter also referred to as the pigment inks) are characterized by excellent weather resistance (such as water resistance or light resistance), compared to the inks using the water-soluble dyes.

However, according to the ink set having the pigment inks that have hitherto been known, it has been impossible to obtain good image quality without depending on the type of paper (particularly, whether paper exclusive to ink jet recording or plain paper).

SUMMARY OF THE INVENITON

The invention has been made for solving the above-mentioned problems.

An object of the invention is to provide an ink set for ink jet recording and an ink jet recording process, which can provide good image quality without depending on the type of paper (particularly, whether paper exclusive to ink jet recording or plain paper).

Other objects and effects of the invention will become apparent from the following description.

As a result of extensive studies, the present inventors have discovered that the above-mentioned objects can be achieved by combining specific pigment inks, thus completing the invention.

That is, the invention provides:

(1) An ink set for ink jet recording comprising at least one "self-dispersion type pigment ink containing water and a pigment dispersible in water without a dispersing agent" and at least one "light-color resin-containing pigment ink containing water and a pigment made dispersible in water with a resin, wherein the concentration of the pigment is one-half or less the concentration of the pigment contained in the self-dispersion type pigment ink";

(2) The ink set described in the above (1), wherein the at least one self-dispersion type pigment ink is at least one selected from the group consisting of a black ink, a magenta ink, a cyan ink and a yellow ink, and the at least one light-color resin-containing pigment ink is at least one selected from the group consisting of a black ink, a magenta ink, a cyan ink and a yellow ink;

( 3) The ink set described in the above (1) or (2), wherein the ink set is constituted so that the at least one self-dispersion type pigment ink and the at least one light-color resin-containing pigment ink correspond to each other in terms of hue;

(4) The ink set described in any one of the above (1) to (3), wherein the pigment in the light-color resin-containing pigment ink is made dispersible with a resin dispersing agent or by coating the pigment with the resin;

(5) An ink jet recording process for conducting ink jet recording using the ink set described in any one of the above (1) to (4), which comprises conducting ink jet recording using the "self-dispersion type pigment ink containing water and a pigment dispersible in water without a dispersing agent" contained in the ink set, and conducting ink jet recording in layers on an image region formed by the self-dispersion type pigment ink, using the "light-color resin-containing pigment ink containing water and a pigment made dispersible in water with a resin, wherein the concentration of the pigment is one-half or less the concentration of the pigment contained in the self-dispersion type pigment ink" contained in the ink set; and (6) The ink jet recording process described in the above (5), wherein the hue of the light-color resin-containing pigment ink and the hue of the self-dispersion type pigment ink overlaid therewith in the same region are conformed to each other.

Figure 1:
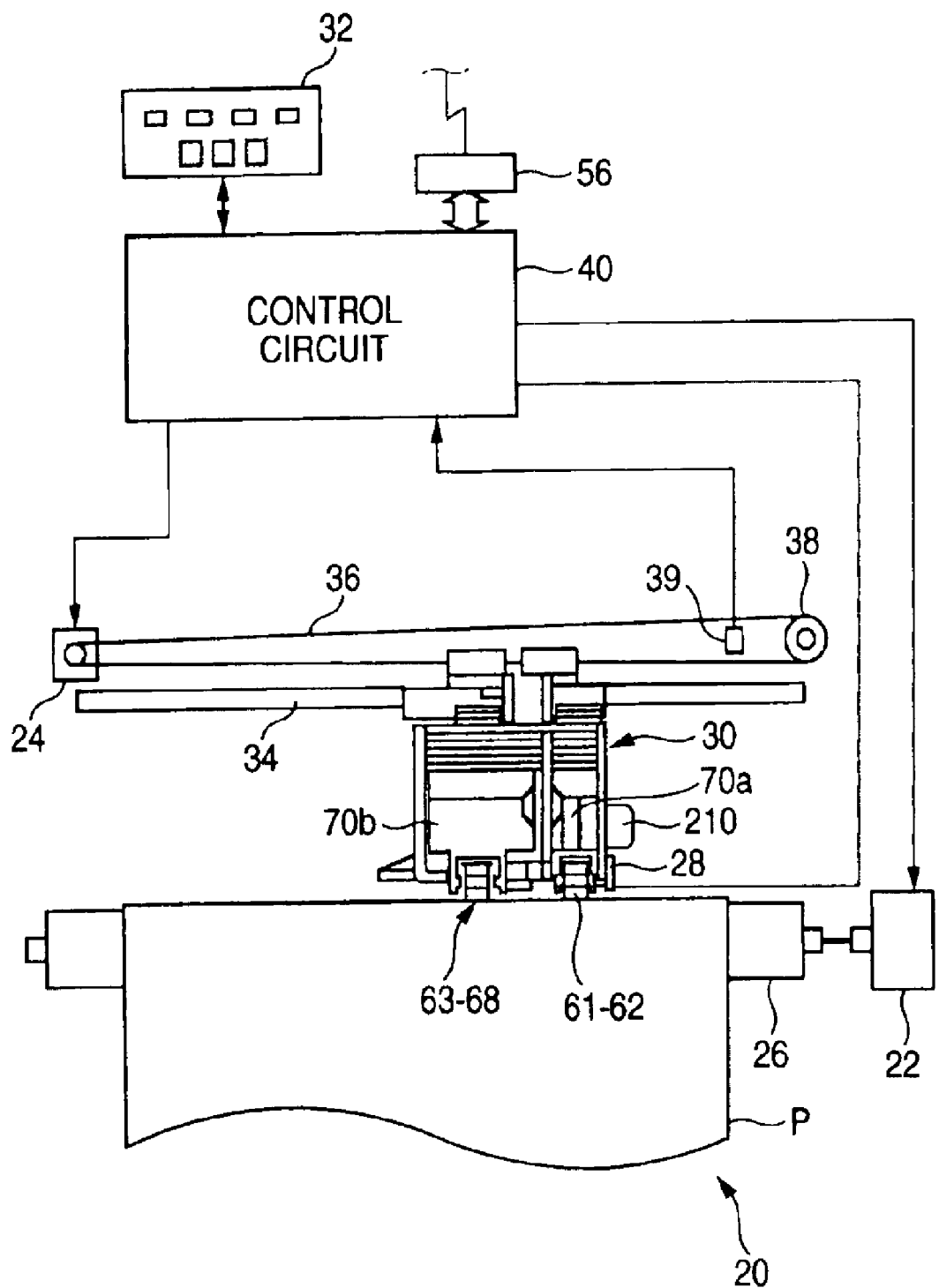
FIG. 1 is a schematic view showing an ink jet recording apparatus embodying the invention.

Reference numerals used in the drawings each designate the following:

20: Ink Jet Recording Apparatus
22: Paper Feed Motor
24: Carriage Motor
26: Platen
28: Print Head
29: Print Head Unit
30: Carriage 32: Operation Panel
34: Sliding Shaft
36: Drive Belt
38: Pulley
39: Position Detecting Sensor
40: Control Circuit
56: Connector
61, 62, 63, 64, 65, 66, 67, 68: Nozzle Lines
70a: Black Ink Cartridge (Ink Set for Ink Jet Recording)
70b: Color Ink Cartridge (Ink Set for Ink Jet Recording)
P: Paper

DETAILED DESCRIPTION OF THE INVENTION

The invention will be described in detail below.

The ink set for ink jet recording (also simply referred to as the "ink set") of the invention comprises at least one "self-dispersion type pigment ink containing water and a pigment dispersible in water without a dispersing agent" and at least one "light-color resin-containing pigment ink containing water and a pigment made dispersible in water with a resin, wherein the concentration of the pigment is one-half or less the concentration of the pigment contained in the self-dispersion type pigment ink".

First, the "self-dispersion type pigment ink containing water and a pigment dispersible in water without a dispersing agent" will be described in detail.

The self-dispersion type pigments dispersible in water without a dispersing agent include a pigment having a hydrophilic group on its surface, which can be suitably produced by treating the surfaces of the pigment particles with a hydrophilic group-imparting agent.

Accordingly, there is no particular limitation on the pigment constituting "the pigment particles having a hydrophilic group on their surfaces", as long as it is a pigment insoluble in the hydrophilic group-imparting agent. Examples thereof include pigments described later.

Preferred examples of the hydrophilic group-imparting agents used in the invention first include a sulfur-containing treating agent.

The sulfur-containing treating agents include sulfuric acid, fuming sulfuric acid, sulfur trioxide, chlorosulfuric acid, fluorosulfuric acid, amidosulfuric acid, a sulfonated pyridine salt and sulfamic acid. A sulfonating agent such as sulfur trioxide, a sulfonated pyridine salt or sulfamic acid is preferred among others. They can be used either alone or as a mixture of two or more of them. The term "sulfonating agent" means a treating agent for imparting a sulfonic acid ($-SO_2OH$) and/or a sulfinic acid ($-RSO_2H$, wherein R is a $C_1-C_{12}$ alkyl group, or a phenyl group or a modified group thereof).

Further, it is also useful to form a complex by using sulfur trioxide and a mixed solvent of a solvent that can form a complex with sulfur trioxide (a basic solvent such as N,N-dimethylformamide, dioxane, pyridine, triethylamine or trimethylamine, nitromethane or acetonitrile) and at least one of solvents described later.

In particular, when sulfur trioxide itself is too high in reactivity, which causes decomposition or deterioration of the pigment itself, or when it is hard to control the reaction with a strong acid, it is preferred that surface treatment of the pigment particles (sulfonation in this case) is conducted using the complex of sulfur trioxide and the tertiary amine as described above.

The independent use of sulfuric acid, fuming sulfuric acid, chlorosulfuric acid or fluorosulfuric acid easily dissolves the pigment particles, so that the control of the reaction is required to such a strong acid as to react for each molecule. It is therefore necessary to give attention to the kind of solvent described later and the amount thereof used.

The solvent used in the reaction is selected from solvents that are unreactive to the sulfur-containing treating agent, and in which the above-mentioned pigment is insoluble or slightly soluble. Such solvents include sulfolane, N-methyl-2-pyrrolidone, dimethylacetamide, quinoline, hexamethylphosphoric triamide, chloroform, dichloroethane, tetrachloroethane, tetrachloroethylene, dichloromethane, nitromethane, nitrobenzene, liquid sulfur dioxide, carbon disulfide and trichlorofluoromethane.

The treatment with the sulfur-containing treating agent is conducted by dispersing the pigment particles in the solvent, and adding the sulfur-containing treating agent to the resulting dispersion, followed by heating with stirring at 60° C. to 200° C. for 3 to 10 hours. Specifically, it is preferred that high-speed shear dispersion with a high-speed mixer or impact dispersion with a bead mill or a jet mill is previously conducted to form a slurry-like dispersion. Then, after shifting to gentle stirring, the sulfur-containing treating agent is added to introduce the hydrophilic group to the surfaces of the pigment particles. In this case, the determination of the amount of the hydrophilic group introduced is greatly dependent on the reaction conditions and the kind of sulfur-containing treating agent. Then, after heat treatment, the solvent and the residual sulfur-containing treating agent are removed from the slurry of the pigment particles. For the removal, a method such as water washing, ultrafiltration or reverse osmosis, centrifugation and filtration are repeated.

Further, the above-mentioned sulfonic acid ($-SO_2OH$) and/or sulfinic acid ($-RSO_2H$, wherein R is a $C_1-C_{12}$ alkyl group, or a phenyl group or a modified group thereof) may be treated with an alkali compound, thereby forming the pigment particles having the sulfonic acid ($-SO_2OH$) and/or the sulfinic acid ($-RSO_2H$, wherein R is a $C_1-C_{12}$ alkyl group, or a phenyl group or a modified group thereof) on their surfaces as the hydrophilic group.

As the alkali compound, an alkali compound is selected which gives an alkali metal ion or a univalent ion represented by chemical formula $(R_1R_2R_3R_4N)^+$ (wherein $R_1$, $R_2$, $R_3$ and $R_4$, which may be the same or different, each represents a hydrogen atom, an alkyl group, a hydroxyalkyl group or an alkyl halide group) as a cation. Preferred is an alkali compound giving a lithium ion ($Li^+$), a potassium ion ($K^+$), a sodium ion ($Na^+$), an ammonium ion ($NH_4^+$) or an alkanolamine cation such as a triethanolamine, as a cation.

As an anion of the alkali compound, a hydroxide anion is preferably used. Specific examples thereof include ammonia, an alkanolamine (such as monoethanolamine, diethanolamine, N,N-butylethanolamine, triethanolamine, propanolamine, aminomethylpropanol or 2-aminoisopropanol) and a hydroxide of a univalent alkali metal (such as LiOH, NaOH or KOH).

The amount of the above-mentioned alkali compound added is preferably the neutralization equivalent of the sulfonic acid group and/or sulfinic acid group of the pigment particles or more. Further, the volatile additive such as ammonia or the alkanolamine is preferably added in an amount of approximately 1.5 times the neutralization equivalent or more.

The operation can be performed by adding to the alkali compound the pigment particles to which surfaces the above-mentioned sulfonic acid group and/or sulfinic acid group is chemically bonded, and shaking the resulting mixture with a paint shaker.

Further, the hydrophilic group-imparting agents for treating the surfaces of the pigment particles preferably include a carboxylating agent. The term "carboxylating agent" means a treating agent for imparting a carboxyl group (—$CO_2H$).

Bonds (such as C=C and C—C) on the surfaces of the pigment particles are partially broken using an oxidizing agent such as a hypohalite, for example, sodium hypochlorite or potassium hypochlorite, thus conducting oxidation treatment. In addition to the above-mentioned chemical treatment, a carboxyl group is imparted by physical oxidation such as plasma treatment in some cases. In the invention, however, various procedures can be selected, as long as they are processes in which the dispersion stability in an aqueous medium can be ensured. Further, in the exemplified carboxylic acid-introducing treatment, a quinone group is introduced in some cases, although in small quantities.

To take an example of treatment with the carboxylating agent, the pigment particles are previously dispersed in the aqueous medium by high-speed shear dispersion with a high-speed mixer or impact dispersion with a bead mill or a jet mill to form a slurry-like dispersion. Then, the resulting dispersion is mixed with a hypohalite such as sodium hypochlorite having an effective halogen concentration of 10% to 30% in a suitable amount of water, followed by heating with stirring at 60° C. to 80° C. for about 5 to about 10 hours, preferably for 10 hours or more. This operation is accompanied by considerable heat generation, so that safety concerns are required. Then, the solvent and the residual carboxylating agent are removed from the slurry of the surface-treated pigment particles by heat treatment. It is possible to obtain a desired aqueous dispersion by repeating a method such as water washing, ultrafiltration or reverse osmosis, centrifugation and filtration as needed.

Also in this case, the carboxylic acid group (—$CO_2H$)-containing pigment particles may be treated with an alkali compound, thereby forming the pigment particles having a carboxylic acid anion group (—$CO_2^-$) on their surfaces as the hydrophilic group.

The kind of alkali compound and the treating method with the alkali compound are the same as described above.

Procedures for examining the preferred amount of the hydrophilic group introduced to the surfaces of the pigment particles and the state in which the hydrophilic group is introduced will be described below.

First, when hydrophilization is conducted with the sulfonating agent, the amount of the hydrophilic group introduced to the surfaces of the pigment particles is preferably $10 \times 10^{-6}$ equivalent or more per gram of pigment particles. When the amount of the hydrophilic group introduced is less than $10 \times 10^{-6}$ equivalent, aggregates of the pigment particles become liable to be produced, resulting in the tendency of the average particle size of the pigment to increase.

There is no particular limitation on the upper limit of the amount of the hydrophilic group introduced to the pigment particle. However, when the amount exceeds $150 \times 10^{-6}$ equivalent, no change in the average particle size of the pigment particles with an increase in the amount of the hydrophilic group introduced is observed in some cases. Accordingly, it is preferably $150 \times 10^{-6}$ equivalent or less from the viewpoint of cost.

The amount of the hydrophilic group introduced to the surfaces of the pigment particles with the carboxylating agent will be described below. According to the surface treatment procedures used in the invention, the carboxylic acid group (—$CO_2H$) and/or the carboxylic acid anion group (—$CO_2^-$) is considered to be introduced to the surfaces of the pigment particles. However, the amount introduced can not be directly determined, so that it is measured by the content of surface active hydrogen in the invention. Details of the measuring method will be described later.

The content of active hydrogen in the pigment particles obtained by such procedures is preferably 1.0 mmol/g or more, and more preferably 1.5 mmol/g or more. Less than 1.0 mmol/g results in poor water dispersibility to cause an easy occurrence of coalescence (enlargement of the particle size by natural aggregation of the particles).

Although the pigment particles having the hydrophilic group on their surfaces have been described above in detail, the average particle size of the pigment particles having the hydrophilic group on their surfaces can be easily adjusted to 150 nm or less by the above-mentioned method. In particular, the average particle size is more preferably adjusted to 20 nm to 80 nm by selecting the kind of pigment or hydrophilic group-imparting agent and the amount of the hydrophilic group introduced, thereby being able to more surely produce the black ink excellent in dispersion stability and ejection stability (a characteristic that the ink is stably ejected in a definite direction from a recording head) and enabled to increase the print density of an image. In this specification, the average particle size is described according to the measured value by the laser light scattering method.

Although the pigments which can be used in the self-dispersion type pigment ink of the invention are not limited, preferred examples of black pigments contained in black inks include carbon blacks (C.I. Pigment Black 7) such as furnace black, lamp black, acetylene black and channel black. More specifically, there can be used No. 2300, No. 900, MCF88, No. 33, No. 40, No. 45, No. 52, MA7, MA8, MA100 and No. 2200B manufactured by Mitsubishi Chemical Corporation, Raven 5750, Raven 5250, Raven 5000, Raven 3500, Raven 1255 and Raven 700 manufactured by Columbian Chemicals Company, Regal 400R, Regal 330R, Regal 660R, Mogul L, Monarch 700, Monarch 800, Monarch 880, Monarch 900, Monarch 1000, Monarch 1100, Monarch 1300 and Monarch 1400 manufactured by Cabot Corporation, and Color Black FW1, Color Black FW2, Color Black FW2V, Color Black FW18, Color Black FW200, Color Black S150, Color Black S160, Color Black S170, Pintex 35, Pintex U, Pintex V, Pintex 140U, Special Black 6, Special Black 5, Special Black 4A and Special Black 4 manufactured by Degussa Corporation.

Pigments used in yellow inks include C.I. Pigment Yellow 1 (Fast Yellow G), 2, 3, 12 (Disazo Yellow AAA), 13, 14, 16, 17, 24, 34, 35, 37, 42 (yellow iron oxide), 53, 55, 73, 74, 75, 81, 83 (Disazo Yellow HR), 93, 95, 97, 98, 100, 101, 104, 108, 109, 110, 114, 117, 120, 128, 129, 138, 151, 153, 154 and 155.

Pigments used in magenta inks include C.I. Pigment Red 1, 2, 3, 5, 7, 12, 17, 22 (Brilliant Fast Scarlet), 23, 31, 38, 48 (Ca), 48 (Mn), 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57 (Ca), 57:1 (Brilliant Carmine 6B), 60:1, 63:1, 63:2, 64:1, 81 (Rhodamine 6G Lake), 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 209 and 219, and C.I. Pigment Violet 19 and 42.

Pigments used in cyan inks include C.I. Pigment Blue 1, 2, 3, 15 (Phthalocyanine Blue R), 15:1, 15:2, 15:3 (Phthalocyanine Blue G), 15:4, 15:6 (Phthalocyanine Blue E), 15:34, 16, 17:1, 22, 56, 60 and 63, C.I. Vat Blue 4 and C.I. Vat Blue 60.

Pigments used in green inks include C.I. Pigment Green 1, 4, 7, 8, 10, 17, 18 and 36.

The particle size of the pigment is preferably 1 $\mu$m or less, and more preferably from 0.01 to 0.20 $\mu$m, from the viewpoint of ejection stability.

The content of "self-dispersion type pigment dispersible in water without a dispersing agent" is preferably 0.1 to 25% by weight, more preferably 0.5 to 15% by weight, based on the ink.

Then, the light-color resin-containing pigment ink will be described in detail.

In the invention, there is no particular limitation on the dispersing method of the pigment contained in the light-color resin-containing pigment ink, as long as the pigment is dispersed in water with the resin. The mode that the pigment is dispersed in water with a resin dispersing agent, and the mode that the pigment is dispersed in water by coating the pigment with a resin are preferred.

The resin dispersing agents which can be used in the light-color resin-containing pigment ink of the invention preferably include natural polymers. Specific examples thereof include proteins such as glue, gelatin, casein and albumin; natural gums such as gum Arabic and tragacanth gum; glucosides such as saponin; alginic acid derivatives such as alginic acid, alginic acid-propylene glycol ester, triethanolamine alginate and ammonium alginate; and cellulose derivatives such as methyl cellulose, carboxymethyl cellulose, hydroxyethyl cellulose and ethylhydroxy cellulose.

Further, preferred examples of the resin dispersing agents also include synthetic polymers. Specific examples thereof include polyvinyl alcohol derivatives; polyvinylpyrrolidone derivatives; acrylic resins such as polyacrylic acid, an acrylic acid-acrylonitrile copolymer, a potassium acrylate-acrylonitrile copolymer, a vinyl acetate-acrylate copolymer and an acrylic acid-acrylate copolymer; styrene-acrylic resins such as a styrene-acrylic acid copolymer, a styrene-methacrylic acid copolymer, a styrene-methacrylic acid-acrylic acid copolymer, a styrene-$\alpha$-methylstyrene-acrylic acid copolymer and a styrene-$\alpha$-methylstyrene-acrylic acid-acrylate copolymer; a styrene-maleic anhydride copolymer; a vinylnaphthalene-acrylic acid copolymer; a vinylnaphthalene-maleic acid copolymer, vinyl acetate-based copolymers such as a vinyl acetate-ethylene copolymer, a vinyl acetate-fatty acid vinyl ethylene copolymer, a vinyl acetate-maleic acid ester copolymer, a vinyl acetate-crotonic acid copolymer and a vinyl acetate-acrylic acid copolymer; and salts thereof. Of these, a copolymer of a hydrophobic group-containing monomer and a hydrophilic group-containing monomer and a polymer obtained from a monomer having both a hydrophobic group and a hydrophilic group in its molecular structure are particularly preferred. The copolymer may be either a random copolymer or a block copolymer. The above-mentioned salts include salts of diethylamine, ammonium, ethylamine, triethylamine, propylamine, isopropylamine, dipropylamine, butylamine, isobutylamine, triethanolamine, diethanolamine, aminomethylpropanol and morpholine. These compounds for forming the salts may be used in any amount, as long as they are added in an amount equal to or more than the neutralization equivalent of the dispersing agents composed of organic compounds before the salt formation. However, from the viewpoint of fixing properties after printing, the amount thereof added is preferably about 1.3 times the neutralization equivalent.

The weight average molecular weight of these copolymers is preferably from 1,000 to 50,000, and more preferably from 3,000 to 10,000.

When these resin dispersing agents are used, the amount thereof added is preferably from about 1% to about 100% by weight, and more preferably from 2% to 70% by weight, based on the pigment.

In the invention, the particularly preferred resin dispersing agent is the salt of the styrene-(meth)acrylic acid copolymer. Such a salt of the styrene-(meth)acrylic acid copolymer basically indicates one containing at least a styrene skeleton and a skeleton of the salt of the styrene-(meth)acrylic acid copolymer in its structure, and may contain a skeleton derived from a monomer having another unsaturated group, such as a (meth)acrylate skeleton, in its structure. Such a salt of the styrene-(meth)acrylic acid copolymer may be either a random copolymer or a block copolymer, and is produced by known polymerization methods such as radical polymerization and group transfer polymerization. The acid value of such a salt of the styrene-(meth)acrylic acid copolymer is preferably within the range of 50 to 300, and more preferably within the range of 70 to 150. Further, the molecular weight is preferably within the range of 1,000 to 50,000, more preferably within the range of 1,000 to 150,000, and still more preferably within the range of 3,000 to 10,000, by the weight average molecular weight.

As the above-mentioned resin dispersing agents, commercially available agents can be used, and specific examples thereof include Joncryl 68 (molecular weight: 10,000, acid value: 195), Joncryl 680 (molecular weight: 3,900, acid value: 215), Joncryl 682 (molecular weight: 1,600, acid value: 235), Joncryl 550 (molecular weight: 7,500, acid value: 200), Joncryl 555 (molecular weight: 5,000, acid value: 200), Joncryl 586 (molecular weight: 3,100, acid value: 105), Joncryl 683 (molecular weight: 7,300, acid value: 150) and B-36 (molecular weight: 6,800, acid value: 250) manufactured by Johnson Polymer Co.

Further, it is also possible to use a polymerizable surfactant described later as the resin dispersing agent.

The pigment is dispersed with the above-mentioned resin dispersing agent, water and a water-soluble organic solvent as needed in an appropriate dispersing device such as a ball mill, a sand mill, an attritor, a roll mill, an agitator mill, a Henschel mixer, a colloid mill, an ultrasonic homogenizer, a jet mill or an Angmill.

The pigments which can be used in the light-color resin-containing pigment ink include but are not limited to the pigments enumerated above.

When the pigment contained in the light-color resin-containing pigment ink is dispersed in water with the resin dispersing agent, the content of the pigment in the pigment ink is one-half or less, preferably one-half to one-twentieth the concentration of the pigment contained in the self-dispersion type pigment ink. More specifically, the content of the resin is preferably within the range of 0.05% to 12.5% by weight, and more preferably within the range of 0.1% to 5% by weight, based on the light-color resin-containing pigment ink.

The use of such a light-color resin-containing pigment ink allows a granular feeling of an image region (particularly, a halftone region) to decrease.

Then, the mode that the pigment of the light-color resin-containing pigment ink is dispersed in water by coating the pigment with the resin is specifically described below. In the invention, coating of the pigment with the resin means a state in which the pigment is completely enveloped.

There is no particular limitation on the pigment to be coated, and the pigments enumerated above can be used.

The resin for coating the pigment is preferably a resin containing as a main component at least one selected from the group consisting of a vinyl polymer such as a polyacrylic acid ester, a styrene-acrylic acid copolymer or polystyrene, a polyester, a polyamide, a polyimide, a silicon-containing polymer and sulfur-containing polymer. This allows the pigment to be stably coated with the resin, so that the use of the pigment coated with the above-mentioned resin can provide stable ejection and good images.

In a particularly preferred embodiment of the invention, a resin obtained by polymerizing a monomer or oligomer having an acryloyl group, a methacryloyl group, a vinyl group or an allyl group as a double bond according to a know polymerization method using a polymerization initiator can be suitably used as the above-mentioned resin.

The monomers used herein include, for example, styrene, tetrahydrofurfuryl acrylate, butyl acrylate, an (a, 2, 3 or 4)-alkylstyrene, an (a, 2, 3 or 4)-alkoxystyrene, 3,4-dimethylstyrene, a-phenylstyrene, divinylbenzene, vinylnaphthalene, dimethyl amino(meth)acrylate, dimethylaminoethyl (meth)acrylate, dimethylaminopropylacrylamide, N,N-dimethylaminoethyl acrylate, acryloyl morpholino, N,N-dimethylacrylamide, N-isopropylacrylamide, N,N-diethylacrylamide, methyl (meth)-acrylate, ethyl (meth)acrylate, propyl (meth)acrylate, ethylhexyl (meth)acrylate, other alkyl (meth)acrylates, methoxydiethylene glycol (meth)acrylate, (meth)acrylate of diethylene glycol or polyethylene glycol having an ethoxy group, propoxy group or butoxy group, cyclohexyl (meth) acrylate, benzyl (meth)acrylate, phenoxyethyl (meth) acrylate, isobornyl (meth)acrylate, a hydroxyalkyl (meth) acrylate, a fluorine-, chlorine- or silicon-containing (meth) acrylate and maleamide. When crosslinking structure is introduced in addition to monofunctional structure such as (meth)acrylic acid, there can be used acrylic group- or methacrylic group-containing compounds such as (mono, di, tri, tetra, poly)ethylene glycol di(meth)acrylate, (meth) acrylate of 1,4-butanediol, 1,5-pentanediol, 1,6-hexanediol, 1,8-octanediol or 1,10-decanediol, trimethylolpropane tri (meth)acrylate, glycerin(di, tri)(meth)acrylate, di(meth) acrylate of an ethylene oxide addition product of bisphenol A or bisphenol F, neopentyl glycol di(meth)acrylate, pentaerythritol tetra(meth)acrylate and dipentaerythritol hexa (meth)acrylate.

As the polymerization initiators, there can be used general initiators used in radical polymerization such as hydrogen persulfate, azobisisobutyronitrile, benzoyl peroxide, dibutyl peroxide, peracetic acid, cumene hydroperoxide, t-butylhydroxyperoxide and p-menthane hydroperoxide, as well as potassium persulfate and ammonium persulfate. In particular, water-soluble polymerization initiators are preferably used.

Methods for coating the resin with such a resin include phase inversion emulsification, acid acidifying out and forced emulsification.

As a specific example of the phase inversion emulsification, a method has been known in which a self water-dispersible resin (self water-dispersible polymer) which acid groups are partly neutralized with a base is dissolved in an organic solvent, and a colored resin solution obtained by dispersing or dissolving a pigment in the resulting solution is mixed with an aqueous medium containing water as an indispensable component, there by conducting the phase inversion emulsification. In the phase inversion emulsification, particles of the pigment coated with the above-mentioned resin are produced, so that subsequent removal of the organic solvent with the aqueous medium allows the pigment coated with the resin to be suitably obtained. As the self water-dispersible resin as used herein, a copolymer of (meth)acrylic acid and at least one monomer selected from the group consisting of styrene, a substituted styrene and a (meth)acrylate, which has an acid value of 20 to 200 KOH g/g, can be suitably exemplified.

Further, as another specific example of the phase inversion emulsification, a method has been known in which a polyester is added to a ketone-based solvent together with a pigment, and a neutralizing agent is added to this ketone-based solvent, thereby ionizing carboxyl groups in the polyester, followed by addition of water to conduct the phase inversion emulsification. The ketone-based solvent is removed by distillation from this mixed solution, thereby being able to suitably obtain the pigment coated with the polyester.

The acidifying out includes a method of adding an acidic compound to an aqueous dispersion of a pigment finely dispersed with "a resin (polymer) having carboxyl groups neutralized with a basic compound" to shift the pH of the aqueous dispersion to neutrality or acidity, thereby making the resin hydrophobic to firmly fix the resin on the pigment. Then, a basic compound is added to the resulting aqueous dispersion to neutralize the carboxyl groups of the resin again, thereby being able to suitably obtain an aqueous dispersion of the pigment coated with the resin.

Further, as the forced emulsification, a method has been known in which a pigment and a vinyl polymer having a silicon macromer as a copolymerization component are added to an organic solvent, and a neutralizing agent is added to the resulting solution or dispersion to ionize salt-forming groups in the vinyl polymer, followed by addition of water to conduct the emulsification. Then, the organic solvent is removed by distillation, thereby being able to suitably obtain an aqueous dispersion of the pigment coated with the resin.

The resins for coating the pigments particularly include a copolymer of a polymerizable group-containing dispersing agent described later in detail and a copolymerizable monomer. The pigment coated with the copolymer of the polymerizable group-containing dispersing agent and the copolymerizable monomer is suitably obtained by dispersing the pigment in water with the polymerizable group-containing dispersing agent, and then adding the copolymerizable monomer and a polymerization initiator to polymerize them.

In the ink for ink jet recording, it is preferred from the viewpoints of clogging and ejection stability that the particle size is relatively uniform. It is therefore preferred that the pigment coated with the resin is obtained by dispersing the pigment with the polymerizable group-containing dispersing agent, and then, conducting emulsion polymerization in water using the dispersing agent, the copolymerizable monomer and the polymerization initiator.

The emulsion polymerization can be conducted by usual methods, and the polymerization proceeds through free radicals generated by thermal decomposition of a water-soluble polymerization initiator in the presence of an emulsifier.

The above-mentioned copolymerizable monomer is preferably a compound having an unsaturated group in its structure, and the unsaturated group is particularly preferably a group selected from the group consisting of a vinyl group, an allyl group, an acryloyl group, a methacryloyl group, a propenyl group, an acrylamide group, a vinylamide group, a vinylidene group and a vinylene group.

More specifically, any monomer can be used as the copolymerizable monomer, as long as it is highly polymerizable with the polymerizable group-containing dispersing agent, and commonly used radical polymerizable monomers can be used. The radical polymerizable monomers include a monomer containing at least one unsaturated hydrocarbon group such as a vinyl group, an allyl group, an acryloyl group, a methacryloyl group, a propenyl group, an acrylamide group, a vinylamide group, a vinylidene group or a vinylene group, which is a radical polymerizable group, in its molecule.

Specific examples of the radical polymerizable monomers include styrene and styrene derivatives such as methylstyrene, dimethylstyrene, chlorostyrene, dichlorostyrene, bromostyrene, p-chloromethylstyrene and divinylbenzene; acrylic acid and monofunctional acrylates such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, 2-acryloyloxyethylsuccinic acid, 2-acryloyloxyethylphthalic acid, caprolactone acrylate and glycidyl acrylate; methacrylic acid and monofunctional methacrylates such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, 2-methacryloyloxyethylsuccinic acid, 2-methacryloyloxyethylphthalic acid, caprolactone methacrylate and glycidyl methacrylate; allyl compounds such as aminoethyl acrylate, aminopropyl acrylate, methylaminoethyl acrylate, methylaminopropyl acrylate, ethylaminoethyl acrylate, ethylaminopropyl acrylate, acrylic aminoethylamide, acrylic aminopropylamide, acrylic methylaminoethylamide, acrylic methylaminopropylamide, acrylic ethylaminoethylamide, acrylic ethylaminopropylamide, methacrylamide, aminoethyl methacrylate, aminopropyl methacrylate, methylaminoethyl methacrylate, methylaminopropyl methacrylate, ethylaminoethyl methacrylate, ethylaminopropyl methacrylate, methacrylic aminoethylamide, methacrylic aminopropylamide, methacrylic methylaminoethylamide, methacrylic methylaminopropylamide, methacrylic ethylaminoethylamide, methacrylic ethylaminopropylamide, hydroxymethyl acrylate, hydroxymethyl methacrylate, N-methylolacrylamide, allyl alcohol, allylbenzene, allyl-3-cyclohexane propionate, 1-allyl-3,4-dimethoxybenzene, allyl phenoxyacetate, allyl phenylacetate, allylcyclohexane and an allyl ester of a multivalent carboxylic acid; fumaric acid, maleic acid, itaconic acid and an ester thereof; and radical polymerizable group-containing monomers such as acrylonitrile, methacrylonitrile, maleic anhydride, N-substituted maleimide and a cyclic olefin.

In particular, a hydrophilic group-containing monomer is preferably used as the copolymerizable monomer. Carboxyl group-containing monomers include, for example, acrylic acid, methacrylic acid, crotonic acid, ethacrylic acid, propylacrylic acid, isopropylacrylic acid, 2-methacryloyloxyethylsuccinic acid, 2-methacryloyloxyethylphthalic acid, itaconic acid, fumaric acid and maleic acid. Of these, acrylic acid and methacrylic acid are preferred.

Sulfonic acid group-containing monomers include, for example, 4-styrenesulfonic acid and a salt thereof, sulfoethyl methacrylate and a salt thereof, a sulfoalkyl acrylate and a salt thereof, a sulfoalkyl methacrylate and a salt thereof, sulfopropyl acrylate and a salt thereof, sulfopropyl methacrylate and a salt thereof, a sulfoaryl acrylate and a salt thereof, a sulfoaryl methacrylate and a salt thereof, butylacrylamidosulfonic acid and a salt thereof, and 2-acrylamido-2-methylpropanesulfonic acid and a salt thereof.

Hydroxyl group-containing monomers include, for example, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, polyethylene glycol (400) acrylate, polyethylene glycol (400) methacrylate, N-hydroxyethyl acrylate and N-hydroxyethyl methacrylate.

Amido group-containing monomers include acrylamide, methacrylamide, acrylic aminopropylamide, methacrylic aminopropylamide, acrylic aminoethylamide, methacrylic aminoethylamide and vinylpyrrolidone.

Phosphon group-containing monomers include phosphoethyl methacrylate.

A polymerizable surfactant represented by formula (I) (described later in detail), which is preferred as the polymerizable group-containing dispersing agent, is a monomer having high electron-donating ability. It is therefore preferred that a monomer having high electron-accepting ability is used as the copolymerizable monomer. Specific examples of the monomers having high electron-accepting ability include acrylonitrile, fumaronitrile, a fumaric diester such as dibutyl fumarate, a maleic diester such as dibutyl maleate, a maleimide derivative such as N-phenylmaleimide, and vinylidene cyanide. They may be used either alone or as a mixture of two or more of them.

The molar ratio of the copolymerizable monomer added to the polymerizable group-containing dispersing agent is preferably within the range of about 2 to about 15, and more preferably within the range of about 3 to about 12. When the molar ratio is 2 or more, pigment particles coated with a resin formed come to have excellent dispersion stability in an aqueous medium. On the other hand, when the molar ratio is 15 or less, the monomer can be sufficiently dissolved in an adsorption layer of the polymerizable group-containing dispersing agent, which can inhibit the formation of a water-insoluble polymer and a relative decrease in the amount of ionic repulsive groups. It is therefore possible to enhance dispersion stability of the ink.

Preferred examples of polymerization initiators for obtaining the copolymer of the polymerizable group-containing dispersing agent and the copolymerizable monomer include potassium persulfate, ammonium persulfate, sodium persulfate, 2,2-azobis(2-methylpropionamidine) dihydrochloride and 4,4-azobis(4-cyanovaleric acid).

Further, a chain transfer agent can also be used in emulsion polymerization. Examples thereof include n-dodecyl mercaptan, n-octyl mercaptan, a xanthogen derivative such as dimethylxanthogen disulfide or diisobutylxanthogen disulfide, dipentene, indene, 1,4-cyclohexadiene, dihydrofuran and xanthene, as well as t-dodecyl mercaptan.

As a method for dispersing the pigment in water, there can be used a dispersing method such as a method using ultrasonic dispersion, a bead mill, a sand mill or a roll mill. In particular, the use of the dispersing device such as the bead mill, the sand mill or the roll mill is preferred because it is possible to form finely divided particles of the pigment.

The above-mentioned "polymerizable group-containing dispersing agent" may be any, as long as it contains at least a polymerizable group, a hydrophobic group and a hydrophilic group in its molecular structure. In particular, preferred examples thereof include a polymerizable surfactant containing at least a polymerizable group, a hydrophobic group and a hydrophilic group in its molecular structure (a polymerizable group-introduced surfactant) and a polymer dispersing agent containing at least a polymerizable group, a hydrophobic group and a hydrophilic group in its molecular structure (a polymerizable group-introduced polymer dispersing agent).

The polymerizable group may be any, as long as it is a functional group that brings about a polymerization reaction such as radical polymerization, polyaddition or polycondensation. Radical polymerizable groups include unsaturated hydrocarbon groups such as a vinyl group, an allyl group, an acryloyl group, a methacryloyl group, a vinylidene group and a vinylene group. Polyaddition reactive groups include an isocyanate group and an isothiocyanate group, and groups that react with these groups include a hydroxyl group, an amino group, a mercapto group and a carboxyl group. Polycondensation reactive groups, which are functional groups that can induce a condensation reaction, include a carboxyl group, a hydroxyl group, an amino group and an alkoxyl group.

The polymerizable group is preferably the unsaturated hydrocarbon group that is the radical polymerizable group, and such an unsaturated hydrocarbon group is preferably selected from the group consisting of a vinyl group, an allyl group, an acryloyl group, a methacryloyl group, a propenyl group, a vinylidene group and a vinylene group.

The hydrophilic group is preferably selected from the group consisting of a carboxyl group, a carbonyl group, a hydroxyl group, a sulfone group, a sulfonic acid group, salts thereof and a quaternary ammonium salt.

As the polymerizable group-introduced polymer dispersing agent, there can be used a dispersing agent in which the polymerizable group is introduced into a synthetic polymer described below. Specific examples of the synthetic polymers include polyvinyl alcohols; polyvinylpyrrolidones; acrylic resins such as polyacrylic acid, an acrylic acid-acrylonitrile copolymer, a potassium acrylate-acrylonitrile copolymer, a vinyl acetate-acrylate copolymer and an acrylic acid-acrylate copolymer, and salts thereof; styrene-acrylic resins such as a styrene-acrylic acid copolymer, a styrene-methacrylic acid copolymer, a styrene-methacrylic acid-acrylate copolymer, a styrene-α-methylstyrene-acrylic acid copolymer and a styrene-α-methylstyrene-acrylic acid-acrylate copolymer, and salts thereof; a styrene-maleic acid copolymer, a styrene-maleic anhydride copolymer, a vinylnaphthalene-maleic acid copolymer and salts thereof; and vinyl acetate copolymers such as a vinyl acetate-ethylene copolymer, a vinyl acetate-fatty acid vinyl ethylene copolymer, a vinyl acetate-maleate copolymer, a vinyl acetate-crotonic acid copolymer and a vinyl acetate-acrylic acid copolymer, and salts thereof. Of these, a copolymer of a hydrophobic group-containing monomer and a hydrophilic group-containing monomer, and a polymer obtained from a monomer having both a hydrophobic group and a hydrophilic group in its molecular structure are particularly preferred.

In a preferred embodiment of the invention, the polymerizable surfactant is used as the polymerizable group-containing dispersing agent.

In the polymerizable surfactant used in the invention, the hydrophilic group is preferably a group selected from the group consisting of a sulfone group, a sulfonic acid group, a carboxyl group, a carbonyl group, a hydroxyl group, salts thereof and a quaternary ammonium salt, and the polymerizable group is preferably an unsaturated hydrocarbon group, more particularly a group selected from the group consisting of a vinyl group, an allyl group, an acryloyl group, a methacryloyl group, a propenyl group, a vinylidene group and a vinylene group.

Specific examples of such polymerizable surfactants include hydrophilic allyl derivatives as described in JP-B-49-46291 (the term "JP-B" as used herein means an "examined Japanese patent publication"), JP-B-1-24142 and JP-A-62-104802 (the term "JP-A" as used herein means an "unexamined published Japanese patent application"), anionic propenyl derivatives as described in JP-A-62-221431, anionic acrylic acid derivatives as described in JP-A-62-34947 and JP-A-55-11525, anionic itaconic acid derivatives as described in JP-B-46-34898 and JP-A-51-30284, anionic maleic acid derivatives as described in JP-B-51-4157 and JP-A-51-30284, nonionic allyl derivatives as described in JP-A-62-104802, nonionic propenyl derivatives as described in JP-A-62-100502, nonionic acrylic acid derivatives as described in JP-A-56-28208, nonionic itaconic acid derivatives as described in JP-B-59-12681, nonionic itaconic acid derivatives as described in JP-A-59-74102, and cationic allyl derivatives as described in JP-B-4-65824.

The polymerizable surfactant is advantageous in that encapsulated particles are easily formed, because it is adsorbed to surfaces of pigment particles to provide excellent dispersion stability (that is, aggregation of the particles can be prevented) even under subsequent polymerization conditions.

In the invention, the polymerizable surfactant is preferably a compound represented by the following formula (I) or (II). The use of the polymerizable surfactant represented by formula (I) or (II) allows "the pigment coated with the resin" to be stably dispersed in an aqueous medium as minute and stable encapsulated particles. The polymerizable surfactant represented by formula (I) or (II) is advantageous in that encapsulated particles are easily formed, because it is particularly excellent in adsorptivity to a surface of the pigment and dispersion stability (that is, aggregation of the particles can be prevented) under subsequent polymerization conditions. The polymerizable surfactant represented by formula (I) is disclosed in JP-A-5-320276 and JP-A-10-316909.

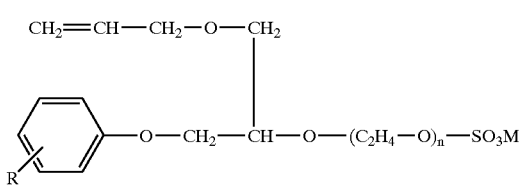

(I)

[In the above formula, R represents a hydrogen atom or a hydrocarbon group having 1 to 12 carbon atoms, n represents a numeral of 2 to 20, and M represents an alkali metal, an ammonium salt or an alkanolamine.]

Appropriate adjustment of R and the value of n in formula (I) makes it possible to allow the surfactant to correspond to the degree of hydrophilicity or hydrophobicity of the surface of the pigment. Preferred examples of the polymerizable surfactants represented by formula (I) specifically include compounds represented by the following formulas (III) to (VI). They may be used either alone or as a mixture of two or more of them.

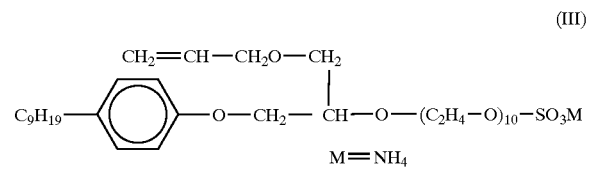

(III)

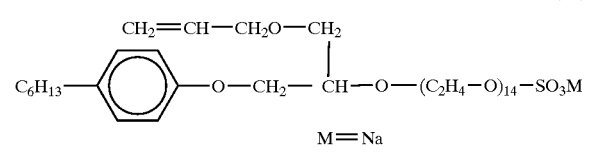

(IV)

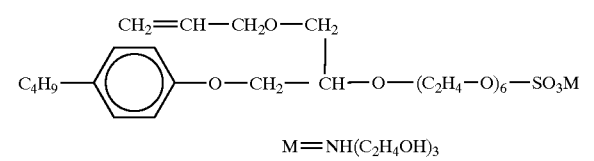

(V)

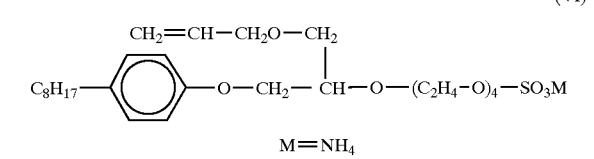

(VI)

As the polymerizable surfactant of formula (I), a commercial product can also be used. For example, SE-10N of the ADEKA REASOAP SE series manufactured by Asahi Denka Co., Ltd., in which R is $C_9H_{19}$, N is 10 and M is $NH_4$, corresponds to the surfactant of formula (III). SE-20N is one equivalent to SE-10N except that n is 20.

Further, the polymerizable surfactant represented by formula (II) is as follows.

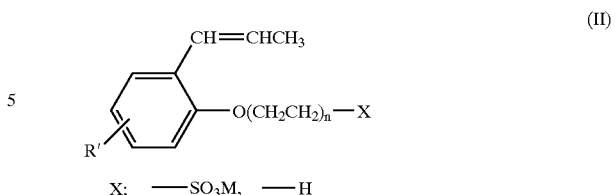

(II)

[In the above formula, R' represents a hydrogen atom or a hydrocarbon group having 1 to 12 carbon atoms, n represents a numeral of 2 to 20, and M represents an alkali metal, an ammonium salt or an alkanolamine.]

R' is preferably $C_9H_{19}$— or $C_8H_{17}$—.

A commercial product other than the above can also be used as the polymerizable surfactant. Such products include, for example, the Aqualon HS series (Aqualon HS-05, HS-10, HS-20 and HS-1025), the Aqualon RN series (RN-10, RN-20, RN-30, RN-50 and RN-2025) and New Frontier series (New Frontier N-177E and S-510) manufactured by Dai-ichi Kogyo Seiyaku Co., Ltd., and the ADEKA REASOAP NE series (NE-10, NE-20, NE-30, NE-40 and NE-50) manufactured by Asahi Denka Co., Ltd.

The amount of the polymerizable surfactant added is preferably within the range of about 10% to about 150% by weight, and more preferably within the range of about 20% to about 100% by weight, based on the pigment. Addition of the surfactant in an amount of 10% by weight or more makes it possible to improve dispersion stability of the ink composition.

Further, addition of the surfactant in an amount of 150% by weight or less inhibits the generation of the polymerizable surfactant not adsorbed by the pigment, and can prevent the generation of the polymer in a place other than the capsule particles. As a result, the ejection stability of the ink composition can be improved.

Furthermore, the pigment coated with the resin also includes minute pigment particles encapsulated as described in JP-B-7-94634 or JP-A-8-59715, a pigment to which surface a polymer group is bonded as described in WO 9951690, and modified particles to which a halogen group-containing polymer group is bonded as described in U.S. Pat. No. 6,103,380.

Also when the pigment contained in the light-color resin-containing pigment ink is dispersed in water by coating the pigment with the resin, the content of the pigment in the pigment ink is one-half or less, preferably one-half to one-twentieth the concentration of the pigment contained in the self-dispersion type pigment ink. More specifically, the content of the resin is preferably within the range of 0.05% to 12.5% by weight, and more preferably within the range of 0.1% to 5% by weight, based on the light-color resin-containing pigment ink.

The use of such a light-color resin-containing pigment ink allows a granular feeling of an image region (particularly, a halftone region) to decrease.

In the invention, each ink can contain any additive.

It is particularly preferred to contain at least one water-soluble organic solvent selected from the group consisting of an acetylenic glycol-based surfactant, an acetylenic alcohol-based surfactant, an glycol ether, a 1,2-alkylene glycol and a compound represented by formula (1), thereby reducing uneven print and blurs at the time when plain paper or paper exclusive to ink jet recording is used, to improve print quality.

RO-(EP)n-M            (1)

In the formula, R is a group having 4 to 10 carbon atoms selected from the group consisting of an alkyl group, a cycloalkyl group, a phenylalkyl group and an aryl group. For example, the aryl group having 4 to 10 carbon atoms is a phenyl group or a naphthyl group. When the carbon number is 3 or less, it is hard to obtain permeability. On the other hand, when the carbon number exceeds 10, the molecular weight increases to cause the problem that the viscosity of the system is liable to increase.

In particular, when a head that ejects the ink with electrostrictive elements is used and water repellent treatment is conducted on a front face of nozzles, exceeding 10 results in the tendency of ejection to become unstable. Accordingly, the carbon number of R is 4 to 10, and preferably 4 to 8. O is an oxygen atom, and EP is repetition of ethyleneoxy and/or propyleneoxy. n is an average in the molecule, and 1 to 30. When n exceeds 30, foam is generated in increased amounts, particularly in the case of repetition of ethyleneoxy. The ink becomes therefore not so easy to use as an ink for ink jet recording. Further, exceeding 30 results in an increase in the average molecular weight, so that the effect of improving print quality is low with respect to the amount of the compound added, and adversely, the harmful effect that the viscosity increases is exerted. It is therefore preferred that n is 30 or less. M is a hydrogen atom, a sulfonate, a phosphate or a borate. Besides the hydrogen atom, M can be used as an alkali metal salt such as a sodium, potassium or lithium salt, an ammonium salt, or an alkanolamine salt such as a triethanolamine or tripropanolamine salt.

In particular, in the ink set of the invention, the ink preferably contains at least one surfactant selected from the group consisting of an acetylenic glycol-based surfactant and an acetylenic alcohol-based surfactant and at least one compound selected from the group consisting of an glycol ether, a 1,2-alkylene glycol and a compound represented by formula (1) as the water-soluble organic solvent, thereby being able to improve print quality.

The water-soluble organic solvent as used herein is preferably contained in an amount of 0.5% to 30% by weight based on the total amount of the ink. When it is contained in an amount of less than 0.5% by weight, the effect of improving permeability is liable to become insufficient, and it becomes difficult to improve print quality. On the other hand, when it is contained in an amount exceeding 30% by weight, the ink becomes not so easy to handle because of increased viscosity, and the effect of improving print quality is liable not to be increased even when it is added more. More preferably, it is contained in an amount of 1% to 15% by weight.

From the viewpoint of improvement of print quality, the one or more surfactants selected from the group consisting of an acetylenic glycol-based surfactant and an acetylenic alcohol-based surfactant preferably include at least one compound selected from the group consisting of 2,4-dimethyl-5-hexyne-3-ol, 2,4,7,9-tetramethyl-5-decyne-4,7-diol, 3,6-dimethyl-4-octyne-3,6-diol and a compound in which 30 or less ethyleneoxy groups and/or propyleneoxy groups are added to each of 2,4-dimethyl-5-hexyne-3-ol, 2,4,7,9-tetramethyl-5-decyne-4,7-diol and 3,6-dimethyl-4-octyne-3,6-diol in average.

As for the compound in which ethyleneoxy groups and/or propyleneoxy groups are added to each of 2,4-dimethyl-5-hexyne-3-ol, 2,4,7,9-tetramethyl-5-decyne-4,7diol and 3,6-dimethyl-4-octyne-3,6-diol, when the number of the ethyleneoxy groups and/or propyleneoxy groups added exceeds 30, foaming of the ink becomes violent, and the effect of improving print quality is liable to be lowered. It is therefore preferred that the number of such groups is 30 or less.

The glycol ethers include a diethylene glycol monoalkyl (having 1 to 8 carbon atoms) ether, a triethylene glycol monoalkyl (having 1 to 8 carbon atoms) ether, a propylene glycol monoalkyl (having 1 to 6 carbon atoms) ether and a dipropylene glycol monoalkyl (having 1 to 6 carbon atoms) ether. They can be used either alone or as a mixture of two or more of them.

Specific examples thereof include ethylene glycol monomethyl ether, ethylene glycol monoethyl ether, ethylene glycol mono-i-propyl ether, ethylene glycol monobutyl ether, ethylene glycol mono-t-butyl ether, ethylene glycol monomethyl ether acetate, diethylene glycol monomethyl ether (DEGmME), diethylene glycol monoethyl ether (DEGmEE), diethylene glycol monopropyl ether (DEGmPE), diethylene glycol mono-i-propyl ether, diethylene glycol monobutyl ether (DEGmBE), diethylene glycol mono-t-butyl ether, ethylene glycol monobutyl ether, diethylene glycol monopentyl ether (DEGmPeE), diethylene glycol monohexyl ether (DEGmHE), diethylene glycol monoheptyl ether (DEGmHpE), diethylene glycol monooctyl ether (DEGmOE), triethylene glycol monomethyl ether (TEGmME), triethylene glycol monoethyl ether (TEGmEE), triethylene glycol monopropyl ether (TEGmPE), triethylene glycol monobutyl ether (TEGmBE), triethylene glycol monopentyl ether (TEGmPeE), triethylene glycol monohexyl ether (TEGmHE), triethylene glycol monoheptyl ether (TEGmHpE), triethylene glycol monooctyl ether (TEGmOE), propylene glycol monomethyl ether (PGmME), propylene glycol monoethyl ether (PGmEE), propylene glycol monopropyl ether (PGmPE), propylene glycol mono-i-propyl ether, propylene glycol monobutyl ether (PGmBE), propylene glycol mono-t-butyl ether, propylene glycol monopentyl ether (PGmPeE), propylene glycol monohexyl ether (PGmHE), dipropylene glycol monomethyl ether (DPGmME), dipropylene glycol monoethyl ether (DPGmEE), dipropylene glycol monopropyl ether (DPGmPE), dipropylene glycol mono-i-propyl ether, dipropylene glycol monobutyl ether (DPGmBE), dipropylene glycol monopentyl ether (DPGmPeE) and dipropylene glycol monohexyl ether (DPGmHE). However, a larger alkyl group causes higher hydrophobicity, so that the glycol ether having methyl, ethyl, propyl or butyl is suitable for improving print quality on plain paper.

In particular, the glycol ether is preferably di(tri)ethylene glycol monobutyl ether and/or (di)propylene glycol monobutyl ether.

The term "(di)propylene glycol monobutyl ether" as used herein means propylene glycol monobutyl ether (PGmBE) and/or dipropylene glycol monobutyl ether (DPGmBE). The term "di(tri)ethylene glycol monobutyl ether" means diethylene glycol monobutyl ether (DEGmBE) and/or triethylene glycol monobutyl ether (TEGmBE).

In order to obtain permeability suitable for the ink for ink jet recording, it is preferred that (di)propylene glycol monobutyl ether is contained in the ink in an amount of 10% by weight or less. When it is contained in an amount exceeding 10% by weight, not only the effect of improving print quality reaches the peak, but also adversely, the harmful effect of an increase in viscosity is liable to occur. Further, (di)propylene glycol monobutyl ether is not so high in water solubility. Accordingly, when it is added to the ink in an amount exceeding to 10% by weight, addition of a dissolving aid tends to become necessary. More preferably, it is added in an amount of 0.5% to 5% by weight.

Further, in order to obtain permeability suitable for the ink for ink jet recording, it is preferred that di(tri)ethylene glycol monobutyl ether is contained in the ink in an amount of 20% by weight or less. When it is contained in an amount exceeding 20% by weight, not only the effect of improving print quality reaches the peak, but also adversely, the harmful effect of an increase in viscosity is liable to occur. More preferably, it is added in an amount of 0.5% to 10% by weight.

In order to obtain permeability suitable for the ink for ink jet recording, it is preferred that a 1,2-alkylene glycol having 4 to 10 carbon atoms is contained in an amount of 10% by weight based on the total amount of the ink. Of the 1,2-alkylene glycols, one having 3 or less carbon atoms can not be very effective in improvement of permeability. On the other hand, when the carbon number exceeds 10, the water solubility is lowered. Accordingly, such a glycol is not so easy to use in a water-soluble ink as used in the invention. It becomes necessary to introduce a structure to which an oxyethylene chain is added or a water-soluble group such as a sulfonic acid group or a phosphoric acid group. When the carbon number is 4 or more, a 1,2-alkylene glycol derivative having a structure to which the above-mentioned water-soluble group is introduced and having 30 or less carbon atoms can also be suitably used.

The 1,2-alkylene glycols include 1,2-butanediol (1,2-BD), 1,2-pentanediol (1,2-PeD), 1,2-hexanediol (1,2-HD), 1,2-octanediol and 1,2-decanediol. When used directly as the 1,2-alkylene glycol, 1,2-pentanediol and/or 1,2-hexanediol is highly effective.

In the ink set of the invention, it is preferred that the compound represented by the above-mentioned formula (1) is contained in the ink in an amount of 10% by weight or less. When it is contained in an amount exceeding 10% by weight, not only the effect of improving print quality reaches the peak, but also adversely, the harmful effect of an increase in viscosity is liable to occur. More preferably, it is added in an amount of 0.5% to 7% by weight.

As a preferred embodiment, the ink can further contain a saccharide and/or glycerol. In particular, the effect of inhibiting evaporation of water is enhanced by using glycerol and the saccharide together, which are soluble in water and have a water retention effect. Accordingly, an increase in viscosity of the ink or solidification of the ink at tips of nozzles of a head caused by drying can be prevented, so that the nozzles can be more surely prevented from being clogged with the ink (clogging reliability can be improved), thereby being able to ensure good ejection stability for a long period of time.

The saccharides which can be used in the invention include monosaccharides, oligosaccharides, polysaccharides and glycosides.

The saccharides used in the invention are added preferably in an amount of 0.05% to 30% by weight, and more preferably in an amount of 3% to 20% by weight. Less than 0.05% by weight can not be very effective in recovery from a phenomenon that the ink dries at tips of nozzles of a head to clog the nozzles, a so-called clogging phenomenon, whereas exceeding 30% by weight results in an increase in viscosity of the ink, which unfavorably causes a problem with regard to ejection stability such as poor ejection.

Further, in order to ensure storage stability, to prevent clogging, to ensure ejection stability, and to ensure standing stability, the ink can contain various additives such as a wetting agent, a moisturizing agent, a dissolving aid, a permeation-regulating agent, a viscosity modifier, a pH adjustor, an antioxidant, an antifungal agent, a preservative and a metal ion trapping agent.

In order to prevent drying of the ink at the tips of the nozzles of the head, the following water-soluble organic solvent soluble in water and having a water retention effect is preferably added as the wetting agent (or the moisturizing agent). Examples thereof include glycerol, ethylene glycol, diethylene glycol, triethylene glycol, polyethylene glycol having a molecular weight of 2,000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, mesoerythritol and pentaerythritol. In the invention, glycerol, ethylene glycol, diethylene glycol and polyethylene glycol having a molecular weight of 2,000 or less are particularly preferably used.

As the preservative, at least one compound selected from the group consisting of an alkylisothiazolone, a chloroalkylisothiazolone, benzoisothiazolone, bromonitroalcohol, an oxazolidine compound and chloroxylenol is preferred.

Specific examples of the commercially available preservatives include, for example, ones containing octylisothiazolone as an active ingredient for the alkylisothiazolone (for example, NS-800H, NS-800G and NS-800P manufactured by Nagase Kasei Kogyo Co., Ltd.), ones containing chloroisomethylthiazolone as an active ingredient for the chloroalkylisothiazolone (for example, NS-500W, NS-80D, NS-CG, NS-TM and NS-RS manufactured by Nagase Kasei Kogyo Co., Ltd.), ones containing benzoisothiazolone as an active ingredient (for example, Proxel XL-2, Proxel BDN, Proxel BD20, Proxel GXL, Proxel LV and Proxel TN manufactured by Zeneca (UK), and Denicide BIT and Denicide NIPA manufactured by Nagase Kasei Kogyo Co., Ltd.), ones containing bromonitroalcohol as an active ingredient (for example, Bronopol, Myacide BT and Myacide AS manufactured by Nagase Kasei Kogyo Co., Ltd.), and ones containing chloroxylenol as an active ingredient (for example, PCMX manufactured by Nagase Kasei Kogyo Co., Ltd.).

Besides, components for improving solubility of ink components, improving permeability to a recording medium, for example, paper, or preventing nozzle clogging include alkyl alcohols such as ethanol, methanol, butanol, propanol and isopropanol, formaldehyde, acetamide, dimethyl sulfoxide, sorbit, sorbitan, acetin, diacetin, triacetin and sulfolane. These can be accordingly selected for use.

In order to further control permeability, it is also possible to add another surfactant to the ink. The surfactant to be added is preferably a surfactant compatible with the ink of the invention, and a highly permeable and stable surfactant of the surfactants. Examples thereof include amphoteric surfactants and nonionic surfactants. The amphoteric surfactants include lauryldimethylaminoacetic acid betaine, 2-alkyl-N-carboxymethyl-N-hydroxyimidazolinium betaine, coconut oil fatty acid amide, propyldimethylaminoacetic acid betaine, polyoctylpolyaminoethylglycine and other imidazoline derivatives. The nonionic surfactants include ether surfactants such as polyoxyethylene alkylallyl ethers such as polyoxyethylene nonylphenyl ether, polyoxyethylene octylphenyl ether and polyoxyethylene dodecylphenyl ether, polyoxyethylene alkyl ethers such as polyoxyethylene oleyl ether and polyoxyethylene lauryl ether, and polyoxyalkylene alkyl ethers; ester surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate; and fluorine-containing surfactants such as a fluorine alkyl ester and a perfluoroalkyl carboxylate.

Further, the pH adjustors, the dissolving aids or the antioxidants include amines such as diethanolamine, triethanolamine, propanolamine, triisopropanolamine and morpholine, and modified products thereof; inorganic salts such as potassium hydroxide, sodium hydroxide and lithium hydroxide; ammonium hydroxide and quaternary ammonium hydroxides (such as tetramethylammonium); carbonates such as potassium carbonate, sodium carbonate and lithium carbonate; phosphates; ureas such as N-methyl-2-pyrrolidone, urea, thiourea and tetramethylurea; allophanates such as allophanate and methyl allophanate; biurets such as biuret, dimetylbiuret and tetramethylbiuret; and L-ascorbic acid and salts thereof. Further, commercially available antioxidants and ultraviolet absorbers can also be used. Examples thereof include Tinuvin 328, 900, 1130, 384, 292, 123, 144, 622, 770 and 292, Irgacor 252 and 153, Irganox 1010, 1076 and 1035, and MD 1024 manufactured by Ciba-Geigy Limited, lanthanide oxides and sodium benzoate.

It is preferred that the ink has a surface tension of 45 mN/m or less. More preferably, the surface tension is within the range of 20 to 45 mN/m. When the surface tension exceeds 45 mN/m, the drying properties of print is deteriorated, blurs become liable to occur, and color bleeding occurs. As a result, it is hard to obtain a good print image. On the other hand, when the surface tension is less than 20 mN/m, the peripheries of the nozzles of the printer head become easily wettable, which causes the occurrence of curved trajectory of ejected ink droplets to raise a problem with regard to ejection stability. The surface tension can be measured with a surface tension meter ordinarily used.

The surface tension of the ink can be controlled within the above-mentioned range by adjusting the kind of each component constituting the ink and the composition ratio thereof.

Although the constitution of the ink contained in the ink set of the invention has been described above, the ink set for ink jet recording of the invention comprises the at least one "self-dispersion type pigment ink containing water and a pigment dispersible in water without a dispersing agent" and the at least one "light-color resin-containing pigment ink containing water and a pigment made dispersible in water with a resin, in which the concentration of the pigment is one-half or less the concentration of the pigment contained in the self-dispersion type pigment ink" in combination.

Each of the "self-dispersion type pigment ink containing water and a pigment dispersible in water without a dispersing agent" and the "light-color resin-containing pigment ink containing water and a pigment made dispersible in water with a resin" is preferably at least one selected from the group consisting of a black ink, a magenta ink, a cyan ink and a yellow ink.

That is, the invention includes various combinations of the inks such as an ink set in which the self-dispersion type pigment ink is the black ink and the magenta ink, and the light-color resin-containing pigment ink is the black ink and the magenta ink, an ink set in which the self-dispersion type pigment ink is the black ink and the magenta ink, and the light-color resin-containing pigment ink is the black ink and the cyan ink, and an ink set in which the self-dispersion type pigment ink is the black ink, the magenta ink and the cyan ink, and the light-color resin-containing pigment ink is the black ink, the cyan ink and the yellow ink.

In the invention, the ink set is preferably constituted so that the at least one self-dispersion type pigment ink and the at least one light-color resin-containing pigment ink correspond to each other in terms of hue.

The term "the ink set constituted so that the at least one resin-containing pigment ink and the at least one self-dispersion type pigment ink correspond to each other in terms of hue" means, for example, an ink set in which when the self-dispersion type pigment ink is the black ink and the magenta ink, the light-color resin-containing pigment ink is the black ink and the magenta ink, an ink set in which when the self-dispersion type pigment ink is the black ink, the magenta ink and the cyan ink, the light-color resin-containing pigment ink is the black ink, the magenta ink and the cyan ink, or an ink set in which when the self-dispersion type pigment ink is the black ink, the magenta ink, the cyan ink and the yellow ink, the light-color resin-containing pigment ink is the black ink, the magenta ink, the cyan ink and the yellow ink.

In the invention, most preferred is an ink set comprising the at least one self-dispersion type pigment ink and the at least one light-color resin-containing pigment ink, and constituted so that they correspond to each other in terms of hue, in which each ink has four kinds of the inks, the black ink, the magenta ink, the cyan ink and the yellow ink, that is, the ink set has 8 kinds of inks, 2 kinds of light and shade colors for each of the black ink, the magenta ink, the yellow ink and the cyan ink. Further, an orange ink or a green ink can also be combined with the above-mentioned combinations.

The invention requires that the concentration of the pigment is one-half or less only the concentration of the pigment contained in the self-dispersion type pigment ink.

According to such an ink set for ink jet recording of the invention, good image quality can be easily obtained without depending on the type of paper (particularly, whether paper exclusive to ink jet recording or plain paper).

In the invention, the pigment is used in the ink as the coloring component, so that the ink has excellent weather resistance (such as light resistance or gas resistance). In particular, the ink in which the pigment coated with the light-color rein-containing resin is used has extremely excellent weather resistance, because the pigment is coated with the resin. The light-color resin-containing pigment ink can be designed at high degrees of freedom by selecting the characteristics of the resin in which the pigment is dispersed and the resin with which the pigment is coated, the polymerization monomer and other reacting agents, so that various functions (such as light resistance, gas resistance, coloring properties, glossiness and fixing properties) can also be given to the ink.

The "pigment dispersible in water without a dispersing agent" used in the ink set of the invention is hard to increase the viscosity of the ink, even when added in large amounts, because it is unnecessary to use the above-mentioned dispersing agent and the elimination of the resin with which the pigment is coated is hard to occur. Accordingly, the amount of the pigment added can be increased, thereby easily obtaining a sufficiently color-developed image.

The ink jet recording process of the invention is an ink jet recording process for conducting ink jet recording using the ink set for ink jet recording, which comprises conducting ink jet recording using the "self-dispersion type pigment ink containing water and a pigment dispersible in water without a dispersing agent" contained in the above-mentioned ink set, and conducting ink jet recording in layers on an image region formed by the self-dispersion type pigment ink, using the "light-color resin-containing pigment ink containing water and a pigment made dispersible in water with a resin, in which the concentration of the pigment is one-half or less the concentration of the pigment contained in the self-dispersion type pigment ink" contained in the above-mentioned ink set.

In the ink jet recording process of the invention, it is preferred that the hue of the light-color resin-containing pigment ink and the hue of the self-dispersion type pigment ink overlaid therewith in the same region are conformed to each other.

The ink jet recording process can be suitably conducted by employing the ink set in the form of a cartridge, mounting the ink cartridge on a known ink jet recording apparatus, and making a print on plain paper or paper exclusive to ink jet recording (paper in which an ink receiving layer for receiving the ink for ink jet recording is formed on a part or the whole region of a surface thereof).

As the ink cartridge (storage case) for containing the inks for ink jet recording, a know cartridge can be suitably used.

The ink jet recording process of the invention will be described below in detail with reference to the drawings.

FIG. 1 is a schematic diagram showing one embodiment of an ink jet recording apparatus 20 (hereinafter also briefly referred to as a "printer"). The printer 20 comprises a mechanism for conveying paper P with a paper feed motor 22, a mechanism for reciprocating a carriage 30 with a carriage motor 24 in an axial direction of a platen 26, a mechanism for driving a print head 28 of a print head unit 29 (see FIG. 3) mounted on the carriage 30 to control ejection of the ink and dot formation, and a control circuit 40 for conducting exchanges of signals among the paper feed motor 22, the carriage motor 24, the print head 28 and an operation panel 32.

The mechanism for conveying the paper P (recording medium) is equipped with a gear train (not shown) for transmitting the rotation of the paper feed motor 22 not only to the platen 26, but also to a paper carrier roll (not shown). Further, the mechanism for reciprocating the carriage 30 comprises a sliding shaft 34 for slidably holding the carriage 30 mounted in parallel with the platen 26, a pulley 38 for stretching an endless drive belt 36 between the carriage motor 24 and the pulley, and a position detecting sensor 39 for detecting an original point of the carriage 30.

Figure 2:
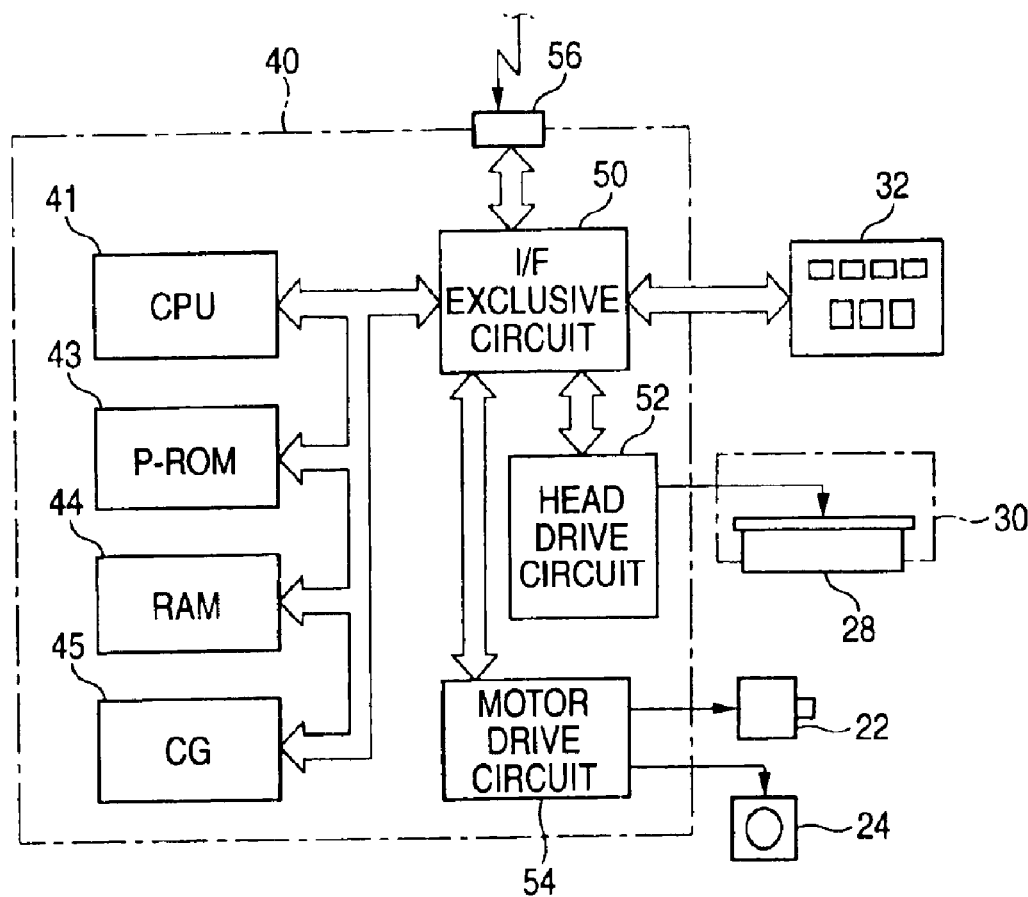
FIG. 2 is a block diagram showing a control circuit in the ink jet recording apparatus shown in FIG. 1.

FIG. 2 is a diagram showing a printer 20 with a central focus on the control circuit 40.

As shown in FIG. 2, the circuit 40 is constituted as an arithmetic and logic circuit mainly comprising for example, a well-known CPU 41, a P-ROM 43 in which a program and the like are stored, a RAM 44 and a character generator (CG) 45 in which dot matrices of letters are stored. In addition, the circuit comprises an I/F exclusive circuit 50 for exclusively interfacing with an external motor, a head drive circuit 52 for driving the print head 28 connected to the I/F exclusive circuit 50, and a motor drive circuit 54 for driving the paper feed motor 22 and the carriage motor 24.

Further, the I/F exclusive circuit 50 contains a parallel interface circuit, is connected to a computer through a connector 56, and can receive signals for print supplied from the computer.

A specific structure of the print head unit 29 mounted on the carriage 30 and the principle of ink ejection carried out through the print head 28 deriving the supply of the inks from the black ink cartridge 70a (see FIG. 4) and the color ink jet cartridge 70b (see FIG. 5) mounted on the print head unit 29 are described below.

Figure 3:
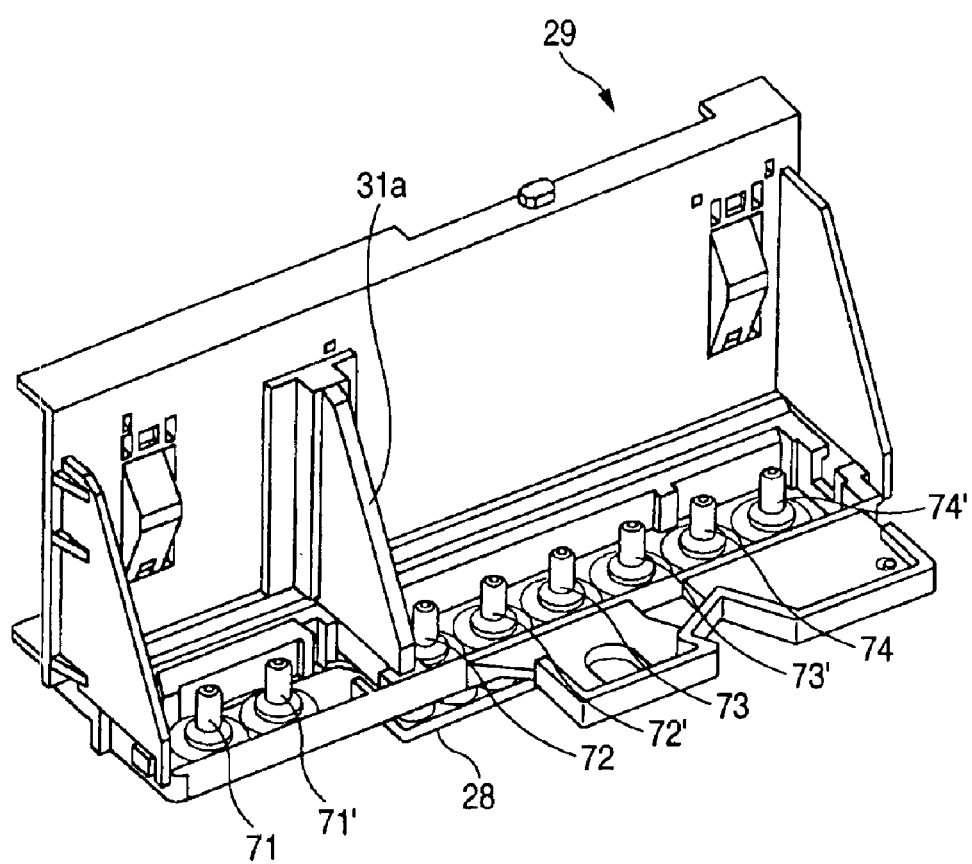
FIG. 3 is a view showing a carriage in the ink jet recording apparatus shown in FIG. 1.

FIG. 3 is a perspective view showing a shape of the print head unit 29. The print head unit 29 is in the form of L in side view, constituted so that the black ink cartridge 70a (see FIG. 4) and the color ink jet cartridge 70b (see FIG. 5) can be mounted thereon, and provided with a partition plate 31a for partitioning the respective cartridges so that they can be loaded separately.

In the print head 28 of a lower portion of the print head unit 29, 8 groups of nozzles for ink ejection are formed in total, and at the bottom of the print head unit 29, introduction pipes 71, 71', 72, 72', 73, 73', 74 and 74' for introducing the inks from ink tanks to the groups of the nozzles for respective colors are provided in standing form. When the black ink cartridge 70a (see FIG. 4) and the color ink jet cartridge 70b (see FIG. 5) are loaded from above on the print head unit 29 provided with the introduction pipes 71, 71', 72, 72', 73, 73', 74 and 74', the introduction pipes 71, 71', 72, 72', 73, 73', 74 and 74' are inserted into connecting openings formed on the respective cartridges, thereby being able to accomplish cartridge loading.

Figure 4:
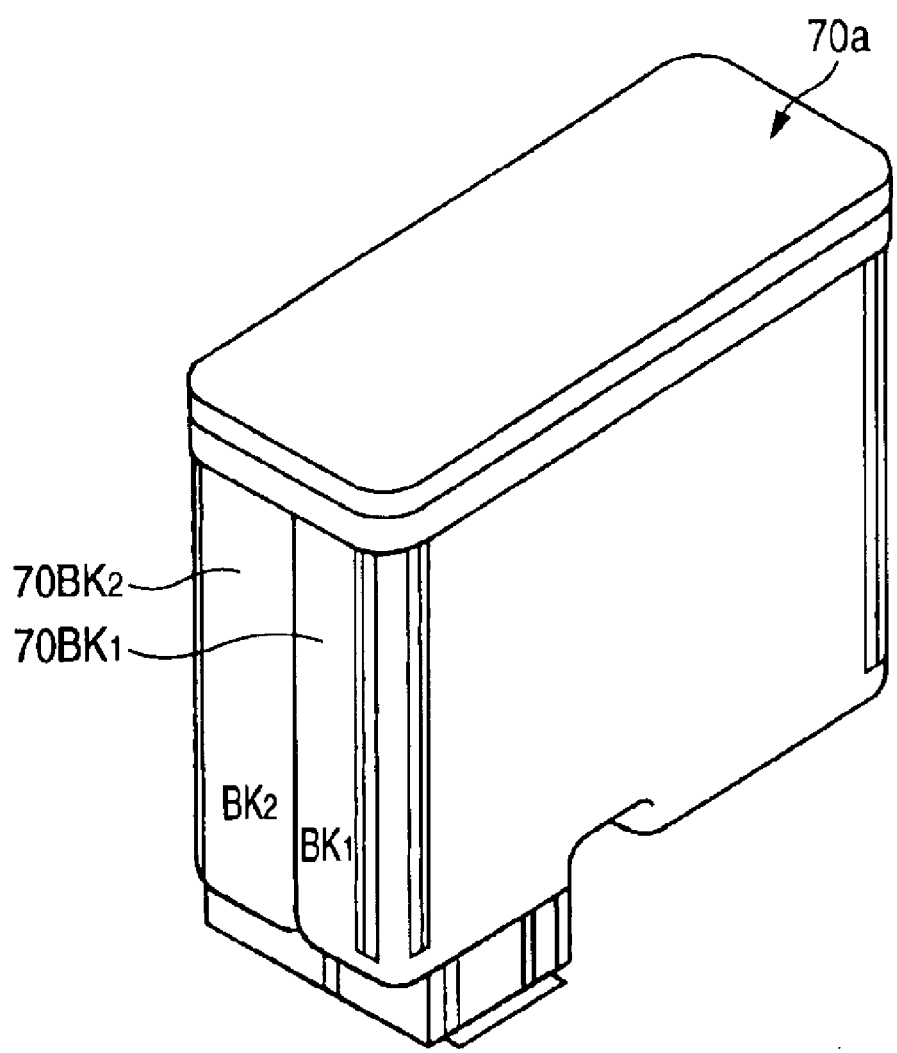
FIG. 4 is an outline drawing showing a black ink cartridge in the ink jet recording apparatus shown in FIG. 1.

The black ink cartridge 70a is integrally composed of tanks $70BK_1$ and $70BK_2$, as shown in FIG. 4.

Figure 5:
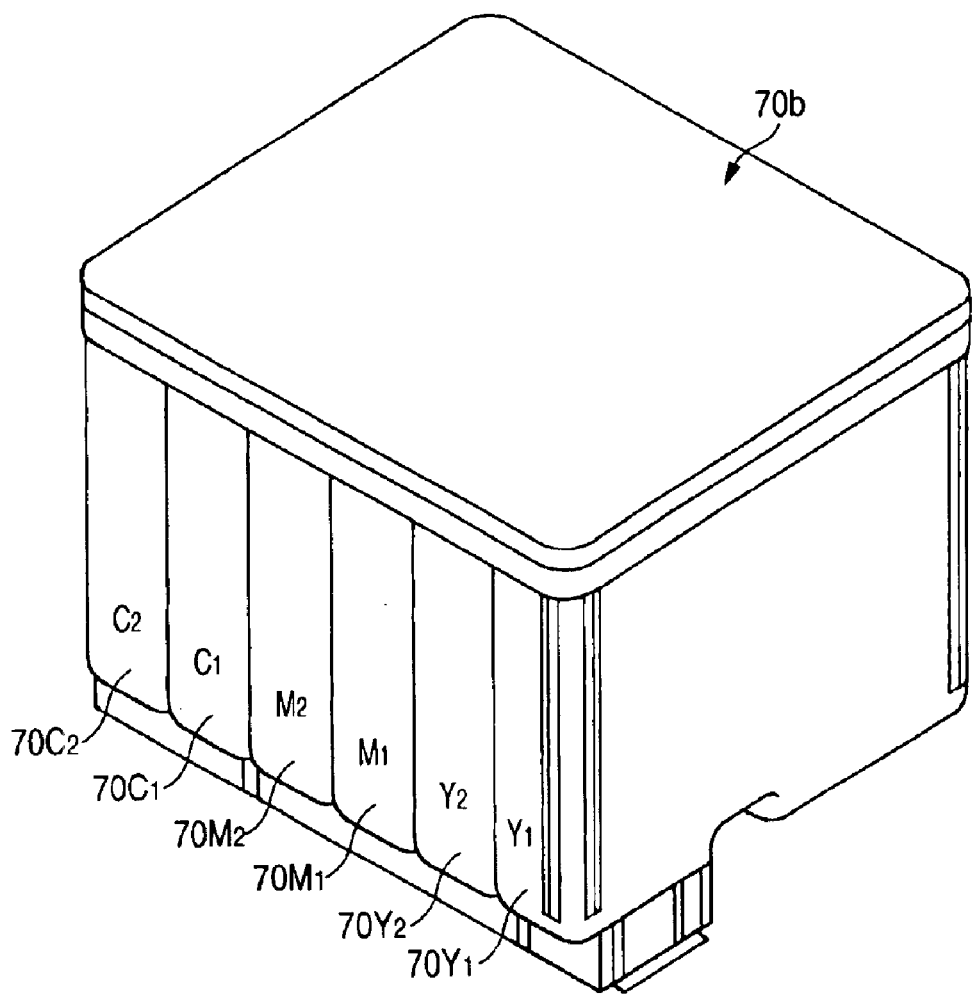
FIG. 5 is an outline drawing showing a color ink cartridge in the ink jet recording apparatus shown in FIG. 1.

Further, the color ink jet cartridge 70b is integrally composed of tanks $70Y_1$, $70Y_2$, $70M_1$, $70M_2$, $70C_1$ and $70C_2$, as shown in FIG. 5.

The tanks $70BK_1$, $70Y_1$, $70M_1$ and $70C_1$ are filled with the self-dispersion type pigment inks, and the tanks $70BK_2$, $70Y_2$, $70M_2$ and $70C_2$ are filled with the light-color resin-containing pigment inks. The order of color arrangement of the ink cartridge is accordingly selected, and not limited thereto.

Figure 6:
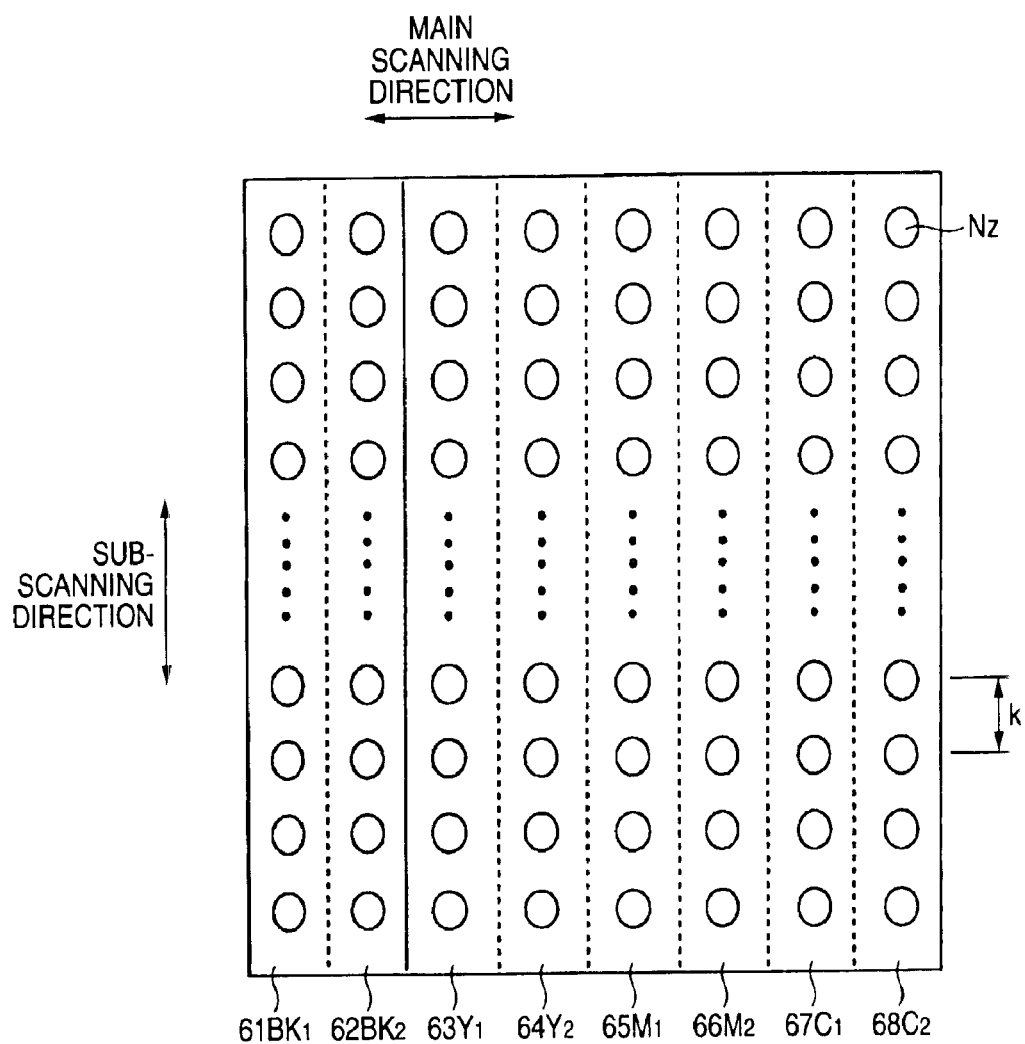
FIG. 6 is an explanatory diagram showing 8 nozzle lines mounted on a print head.

FIG. 6 is an explanatory diagram showing 8 nozzle lines 61 to 68 at the bottom of the print head 28. Each of the nozzle lines 61 to 68 contains 48 nozzles Nz, and the 48 nozzles Nz are arranged in a line at constant intervals K. The respective nozzle lines 61 to 68 are equipped with piezoelectric elements (drive elements) (not shown) corresponding to the respective nozzles Nz. The piezoelectric element is provided so as to be in contact with a path of the ink in the vicinity of the nozzle Nz. The width of the path of the ink can be increased or decreased by application of a predetermined voltage to the piezoelectric element. As a result, ink droplets are ejected from the nozzle Nz. Although each of the nozzle lines 61 to 68 has the plurality of nozzles Nz having the same shape, the amount of ink droplets ejected from each nozzle can be changed by varying the magnitude of voltage applied to the piezoelectric element and the way of applying the voltage.

Of the nozzle lines 61 to 68, the nozzle lines 61 and 62 eject a black ink ($BK_1$) and a black ink ($BK_2$), respectively, supplied from the black ink cartridge 70a. The nozzle lines 63 to 68 eject a yellow ink ($Y_1$), a yellow ink ($Y_2$), a magenta ink ($M_1$), a magenta ink ($M_2$), a cyan ink ($C_1$) and a cyan ink ($C_2$), respectively, supplied from the color ink cartridge 70b.

The printer 20 is constituted so that the ink jet recording is conducted using the "self-dispersion type pigment ink containing water and a pigment dispersible in water without a dispersing agent" contained in the above-mentioned ink set, and the ink jet recording is conducted in layers on an image region formed by the self-dispersion type pigment ink, using the "light-color resin-containing pigment ink containing water and a pigment made dispersible in water with a resin, in which the concentration of the pigment is one-half or less the concentration of the pigment contained in the self-dispersion type pigment ink" contained in the above-mentioned ink set.

That is, when a power source of the printer 20 is turned on to start a print, the inks $70BK_1$, $70Y_1$, $70M_1$ and $70C_1$ are first printed, and then, the inks $70BK_2$, $70Y_2$, $70M_2$ and $70C_2$ are printed thereon in layers.

The print is preferably made herein so that the hue of the light-color resin-containing pigment ink and the hue of the self-dispersion type pigment ink overlaid therewith in the same region become the same, thereby being able to surely obtain an image based on signals for print supplied from the computer. An region to be printed with the light-color ink is printed with the light-color ink alone.

The printer 20 reciprocates the carriage 30 with the carriage motor 24, while rotating the platen 26 and other rolls with the paper feed motor 22 to convey the paper P, and at the same time, the piezoelectric elements of the nozzles for respective colors of the print head 28 are driven to eject the respective color inks, thereby forming a multicolor image on the paper P.

According to the ink jet recording process described above, good image quality can be easily obtained without depending on the type of paper (particularly, whether paper exclusive to ink jet recording or plain paper).

EXAMPLES

The present invention will be illustrated in greater detail with reference to the following Examples, but the invention should not be construed as being limited thereto.

The "amount of an anionic group introduced to surfaces of pigment particles" shown below was determined by the following methods:

Determination of Amount of Hydrophilic Group Introduced (1) The case where a hydrophilic group was introduced with a sulfonating agent:

Pigment particles which surfaces are treated with a sulfonating agent were treated by an oxygen flask combustion method, and a 0.3% aqueous solution of hydrogen peroxide was absorbed by the pigment particles. Then, the sulfuric ion (bivalent) was determined by ion chromatography (Dionex Corporation; 2000i). The resulting value was converted to the value of the sulfonic acid group, and indicated as the molar quantity per g of pigment (mmol/g).

(2) The case where a hydrophilic group was introduced with a carboxylating agent:

As a technique, the Zeisel method was used. Diazomethane was dissolved in an appropriate solvent, and the resulting solution was added dropwise to convert all active hydrogen atoms on the surfaces of the pigment particles to methyl groups. Hydroiodic acid having a specific gravity of 1.7 was added to the pigment thus treated, followed by heating to vaporize the methyl groups as methyl iodide. The gas of methyl iodide was trapped with a silver nitrate solution to precipitate as methylsilver iodide. The amount of the original methyl group, that is, the amount of active hydrogen, was measured from the weight of this methylsilver iodide, and indicated as the molar quantity per g of pigment (mmol/g).

Production of Black Pigment Particles "P1" Having Hydrophilic Group on Their Surfaces Carbon black ("MA-7" manufactured by Mitsubishi Chemical Corporation) (15 parts) was mixed with 200 parts of sulfolane, and dispersed with an Eiger Motor Mill, Type 250 (manufactured by Eiger Japan K.K.) under conditions of a beads filling rate of 70% and a rotational speed of 5,000 rpm for 1 hour. The mixed liquid of the dispersed pigment paste and the solvent was transferred to an evaporator, and heated at 120° C. while reducing the pressure to 30 mmHg or lower, thereby removing water contained in the system by distillation as much as possible. Thereafter, the temperature was controlled to 150° C., and then, 25 parts of sulfur trioxide was added, and allowed to react for 6 hours. After the termination of the reaction, the reaction product was washed several times with excess sulfolane, poured into water, and filtered, thereby obtaining black pigment particles "P1".

The amount of the hydrophilic group introduced into the resulting black pigment particles "P1" was 12 mmol/g.

Production of Black Pigment Particles "P2" Having Hydrophilic Group on Their Surfaces After commercially available acidic carbon black ("MA-100" manufactured by Mitsubishi Chemical Corporation) (300 g) was thoroughly mixed with 1,000 ml of water, 450 g of sodium hypochlorite (effective chlorine concentration: 12%) was added dropwise thereto, followed by stirring at 80° C. for 15 hours. The resulting slurry was washed repeatedly with ion exchanged water while filtering it through Toyo filter paper No. 2. As a measure of the completion of washing, the slurry was washed until white turbidity became disappeared when a 0.1 N aqueous solution of silver nitrate was added to the ion exchanged waster that passed through the filter. This pigment slurry was dispersed again in 2,500 ml of water, and desalted through a reverse osmosis membrane until the electric conductance reached 0.2 microsiemens or less. Further, the slurry was concentrated so as to give a pigment concentration of about 15% by weight.

The resulting surface-treated pigment dispersion was acid treated (acidified with aqueous hydrochloric acid), concentrated, dried and finely pulverized to obtain a powder. As for this surface-treated carbon black powder, the surface active hydrogen content was measured by the above-mentioned method. As a result, it was 2.8 mmol/g.

Production of Cyan Pigment Particles "P3" Having Hydrophilic Group on Their Surfaces A phthalocyanine pigment (C.I. Pigment Blue 15:3) (20 parts) was mixed with 500 parts of quinoline, and dispersed with an Eiger Motor Mill, Type 250 (manufactured by Eiger Japan K.K.) under conditions of a beads filling rate of 70% and a rotational speed of 5,000 rpm for 2 hours. The mixed liquid of the dispersed pigment paste and the solvent was transferred to an evaporator, and heated at 120° C. while reducing the pressure to 30 mmHg or lower, thereby removing water contained in the system by distillation as much as possible. Thereafter, the temperature was controlled to 150° C., and then, 20 parts of a sulfonated pyridine complex was added, and allowed to react for 6 hours. After the termination of the reaction, the reaction product was washed several times with excess quinoline, poured into water, and filtered, thereby obtaining cyan pigment particles "P3".

The amount of the hydrophilic group introduced into the resulting cyan pigment particles "P3" was 4 mmol/g.

Production of Yellow Pigment Particles "P4" Having Hydrophilic Group on Their Surfaces Yellow pigment particles "P4" having the hydrophilic group on their surfaces were obtained by the same treating method as with the above-mentioned "production of cyan pigment particles "P3" having the hydrophilic group on their surfaces" with the exception that "20 parts of the phthalocyanine pigment (C.I. Pigment Blue 15:3)" was substituted by "20 parts of an isoindolinone pigment (C.I. Pigment Yellow 110).

The amount of the hydrophilic group introduced into the resulting yellow pigment particles "P4" was 4.5 mmol/g.

Production of Magenta Pigment Particles "P5" Having Hydrophilic Group on Their Surfaces Magenta pigment particles "P5" having the hydrophilic group on their surfaces were obtained by the same treating method as with the above-mentioned "production of cyan pigment particles "P3" having the hydrophilic group on their surfaces" with the exception that "20 parts of the phthalocyanine pigment (C.I. Pigment Blue 15:3)" was substituted by "20 parts of an isoindolinone pigment (C.I. Pigment Red 122).

The amount of the hydrophilic group introduced into the resulting magenta pigment particles "P5" was 6 mmol/g.

Production of Microcapsulated Pigments "MCP1" to "MCP4"

MCP1 (microcapsulated black pigment), MCP2 (microcapsulated cyan pigment), MCP3 (microcapsulated magenta pigment) and MCP4 (microcapsulated yellow pigment) were produced based on a method described in JP-A-10-140065.

Production of "MCP1"

A flask was charged with 250 g of methyl ethyl ketone, the temperature of which was elevated to 75° C. with stirring under a nitrogen seal. A mixed solution of 85 g of n-butyl methacrylate, 90 g of n-butyl acrylate, 40 g of 2-hydroxyethyl methacrylate, 25 g of methacrylic acid and 20 g of a polymerization initiator, Perbutyl O (tert-butyl peroxyoctoate manufactured by Nippon Oil & Fats Co., Ltd.) was added dropwise thereto for 2 hours, followed by further reaction for 15 hours to obtain a solution of a vinyl polymer.

In a stainless steel beaker, 8 g of the above-mentioned polymer solution was placed together with 0.4 g of dimethylethanolamine and 8 g of a black pigment (MA-100 manufactured by Mitsubishi Chemical Corporation), and ion exchanged water was further added to bring the total amount of 40 g. Then, 250 g of zirconia beads having an average particle size of 0.5 mm was added thereto, followed by kneading with a sand mill for 4 hours. After the termination of kneading, the zirconia beads were removed by filtration to obtain a dispersion in which a dispersion comprising the polymer having the carboxyl group neutralized with the base and the pigment was dispersed in water. A 1 N hydrochloric acid was added to the resulting dispersion with stirring with a dispersing device at ordinary temperature until the resin was insolubilized to be firmly fixed to the pigment. At this time, the pH was 3 to 5. An aqueous medium containing the pigment to which the polymer was firmly fixed was filtered by suction and washed with water to obtain a wet cake. A 10% aqueous solution of NaOH added thereto, while stirring the wet cake with a dispersing device, until the pH of the dispersion reached 8.5 to 9.5, and stirring was continued for 1 hour. Then, ion exchanged water was added to adjust the solid concentration to 20%, thereby obtaining microcapsulated pigment MCP1 of carbon black.

The particle size of the pigment was measured with a laser doppler system size distribution analyzer, Microtrac UPA150, manufactured by Leeds & Northrop Co. As a result, the average particle size was 113 nm.

Production of "MCP2"

A flask was charged with 250 g of methyl ethyl ketone, the temperature of which was elevated to 75° C. with stirring under a nitrogen seal. A mixed solution of 55 g of n-butyl methacrylate, 20 g of n-butyl acrylate, 35 g of 2-hydroxyethyl methacrylate, 40 g of methacrylic acid and 5 g of a polymerization initiator, Perbutyl O, was added dropwise thereto for 2 hours, followed by further reaction for 15 hours to obtain a solution of a vinyl polymer.

In a stainless steel beaker, 10 g of the above-mentioned polymer solution, 7 g of a cyan pigment (C.I. Pigment Blue 15:3), 40 g of methyl ethyl ketone and 150 g of ceramic beads having an average particle size of 0.5 mm were placed, and dispersed with a beads mill dispersing device. Thereafter, the ceramic beads were removed by filtration to prepare paste for a microcapsulated pigment.

Then, 20 g of the above-mentioned paste for a microcapsulated pigment was mixed with 0.2 g of diethanolamine to form an organic solvent phase, and 25 g of ion exchanged water was added dropwise for 20 minutes to the organic solvent phase with stirring while irradiating an ultrasonic wave to cause phase reversal of emulsion, thereby obtaining a microcapsulated pigment-containing aqueous dispersion.

Further, the microcapsulated pigment-containing aqueous dispersion was further distilled at 85° C., thereby removing the solvent. Thus, microcapsulated pigment MCP2 of C.I. Pigment Blue 15:3 was obtained. The particle size of the pigment was measured with a laser doppler system size distribution analyzer, Microtrac UPA150, manufactured by Leeds & Northrop Co. As a result, the average particle size was 146 nm.

Production of "MCP3"

A flask was charged with 250 g of methyl ethyl ketone, the temperature of which was elevated to 75° C. with stirring under a nitrogen seal. A mixed solution of 170 g of n-butyl methacrylate, 58 g of n-butyl acrylate, 35 g of 2-hydroxyethyl methacrylate, 35 g of acrylic acid and 20 g of a polymerization initiator, Perbutyl O, was added dropwise thereto for 2 hours, followed by further reaction for 15 hours to obtain a solution of a vinyl polymer.

In a stainless steel beaker, 15 g of the above-mentioned polymer solution was placed together with 0.8 g of dimethylethanolamine and 15 g of a magenta pigment (C.I. Pigment Red 122), and ion exchanged water was further added to bring the total amount of 75 g. Then, 250 g of zirconia beads having an average particle size of 0.5 mm was added thereto, followed by kneading with a sand mill for 4 hours. After the termination of kneading, the zirconia beads were removed by filtration to obtain a dispersion in which a dispersion comprising the polymer having the carboxyl group neutralized with the base and the pigment was dispersed in water. A 1 N hydrochloric acid was added to the resulting dispersion with stirring with a dispersing device at ordinary temperature until the resin was insolubilized to be firmly fixed to the pigment. At this time, the pH was 3 to 5. An aqueous medium containing the pigment to which the polymer was firmly fixed was filtered by suction and washed with water to obtain a wet cake. A 10% aqueous solution of NaOH added thereto, while stirring the wet cake with a dispersing device, until the pH of the dispersion reached 8.5 to 9.5, and stirring was continued for 1 hour. Then, ion exchanged water was added to adjust the solid concentration to 20%, thereby obtaining microcapsulated pigment MCP3 of C.I. Pigment Red 122.

The particle size of the pigment was measured with a laser doppler system size distribution analyzer, Microtrac UPA150, manufactured by Leeds & Northrop Co. As a result, the average particle size was 170 nm.

Production of "MCP4"

A flask was charged with 250 g of methyl ethyl ketone, the temperature of which was elevated to 75° C. with stirring under a nitrogen seal. A mixed solution of 170 g of n-butyl methacrylate, 5 g of n-butyl acrylate, 35 g of 2-hydroxyethyl methacrylate, 35 g of acrylic acid and 20 g of a polymerization initiator, Perbutyl O, was added dropwise thereto for 2 hours, followed by further reaction for 15 hours to obtain a solution of a vinyl polymer.

In a stainless steel beaker, 15 g of the above-mentioned polymer solution was placed together with 0.8 g of dimethylethanolamine and 15 g of a yellow pigment (C.I. Pigment Yellow 110), and ion exchanged water was further added to bring the total amount of 75 g. Then, 250 g of zirconia beads having an average particle size of 0.5 mm was added thereto, followed by kneading with a sand mill for 4 hours. After the termination of kneading, the zirconia beads were removed by filtration to obtain a dispersion in which a dispersion comprising the polymer having the carboxyl group neutralized with the base and the pigment was dispersed in water. A 1 N hydrochloric acid was added to the resulting dispersion with stirring with a dispersing device at ordinary temperature until the resin was insolubilized to be firmly fixed to the pigment. At this time, the pH was 3 to 5. An aqueous medium containing the pigment to which the polymer was firmly fixed was filtered by suction and washed with water to obtain a wet cake. A 10% aqueous solution of NaOH added thereto, while stirring the wet cake with a dispersing device, until the pH of the dispersion reached 8.5 to 9.5, and stirring was continued for 1 hour. Then, ion exchanged water was added to adjust the solid concentration to 20%, thereby obtaining microcapsulated pigment MCP4 of C.I. Pigment Yellow 110.

The particle size of the pigment was measured with a laser doppler system size distribution analyzer, Microtrac UPA150, manufactured by Leeds & Northrop Co. As a result, the average particle size was 178 nm.

Preparation of Inks for Ink Jet Recording

Inks for ink jet recording (inks 1 to 14 and inks 1' to 9') were prepared, based on compositions shown in Tables 1 to 5.

Ink 1 to ink 14 and inks 1' to 9' were prepared as follows:

Ink 1

In a sand mill (manufactured by Yasukawa Seisakusho), 1.5% by weight of carbon black (Raven C manufactured by Columbia Carbon Co., Ltd.) and 0.25% by weight of an ammonium salt of a styrene-acrylic acid copolymer (a dispersing agent, molecular weight: 7,000, polymer component: 38%) were dispersed to obtain a pigment dispersion. Then, the above-mentioned pigment dispersion was gradually added dropwise to a mixed solvent obtained by mixing 15% by weight of glycerol, 10% by weight of diethylene glycol and the balance of water, and thoroughly stirred. This was filtered through a 5-μm membrane filter to obtain an ink for ink jet recording.

Inks 2 to 14 and Inks 1' to 9'

Inks 2 to 14 and inks 1' to 9' were prepared, based on ink 1. Inks 1' to 9' are each a resin-containing pigment ink containing water and a pigment made dispersible in water with a resin, but having a pigment concentration exceeding one-half the concentration of a pigment in each of self-dispersion type inks 10 to 14. The compounding ratio of each ink is indicated in Tables 1 to 5 shown below.

In Tables 1 to 5, all amounts added are indicated in percentages by weight.

TABLE 1

| | | Ink 1 | Ink 2 | Ink 3 | Ink 4 | Ink 5 |
|---|---|---|---|---|---|---|
| Pigment | Carbon Black | 1.5 | 1.5 | | | |
| | C.I. Pigment Red 122 | | | 1.5 | | |
| | C.I. Pigment Blue 15:3 | | | | 1.5 | |
| | C.I. Pigment Yellow 185 | | | | | 1.5 |
| Ammonium Salt of Styrene-Acrylic Acid Copolymer (molecular weight: 7,000, polymer component: 38%) | | 0.25 | 0.25 | 0.25 | 0.25 | 0.25 |
| Glycerol | | 15 | 10 | 10 | 15 | 10 |
| Diethylene Glycol | | 10 | 8 | 8 | 10 | 8 |
| 1,2-Hexanediol | | | | | | 5 |
| 2-Pyrrolidone | | | 2 | 2 | | 2 |
| Olfin E1010 | | | 1 | 1 | | |
| Potassium Hydroxide | | 0.1 | 0.1 | 0.1 | 0.1 | 0.1 |
| Proxel XL-2 | | 0.05 | 0.05 | 0.05 | 0.05 | 0.05 |
| Ion Exchanged Water | | Balance | Balance | Balance | Balance | Balance |

TABLE 2

| | | Ink 1' | Ink 2' | Ink 3' | Ink 4' | Ink 5' |
|---|---|---|---|---|---|---|
| Pigment | Carbon Black | 6 | 6 | | | |
| | C.I. Pigment Red 122 | | | 6 | | |
| | C.I. Pigment Blue 15:3 | | | | 6 | |
| | C.I. Pigment Yellow 185 | | | | | 6 |
| Ammonium Salt of Styrene-Acrylic Acid Copolymer (molecular weight: 7,000, polymer component: 38%) | | 1 | 1 | 1 | 1 | 1 |
| Glycerol | | 15 | 10 | 10 | 15 | 10 |
| Diethylene Glycol | | 10 | 8 | 8 | 10 | 8 |
| 1,2-Hexanediol | | | | | | 5 |
| 2-Pyrrolidone | | | 2 | 2 | | 2 |
| Olfin E1010 | | | 1 | 1 | | |
| Potassium Hydroxide | | 0.1 | 0.1 | 0.1 | 0.1 | 0.1 |
| Proxel XL-2 | | 0.05 | 0.05 | 0.05 | 0.05 | 0.05 |
| Ion Exchanged Water | | Balance | Balance | Balance | Balance | Balance |

TABLE 3

| | | Ink 6 | Ink 7 | Ink 8 | Ink 9 |
|---|---|---|---|---|---|
| Pigment Coated with Resin (Microcapsulated Pigment) | MCP1 (Black) | 1.5 | | | |
| | MCP2 (Cyan) | | 1.5 | | |
| | MCP3 (Magenta) | | | 1.5 | |
| | MCP4 (Yellow) | | | | 1.5 |
| Glycerol | | 15 | 10 | 10 | 15 |
| Diethylene Glycol | | | 5 | 5 | |
| Trimethylolpropane | | | 6 | 6 | 6 |
| Diethylene Glycol Monobutyl Ether | | 8 | | | |
| 1,3-Dimethyl-2-imidazolidinone | | | | | |
| 2-Pyrrolidone | | | | | |
| Surfynol 465 | | 1 | 1 | 1 | 1 |
| Potassium Hydroxide | | 0.1 | 0.1 | 0.1 | 0.1 |
| Proxel XL-2 | | 0.05 | 0.05 | 0.05 | 0.05 |
| Ion Exchanged Water | | Balance | Balance | Balance | Balance |

TABLE 4

| | | Ink 6' | Ink 7' | Ink 8' | Ink 9' |
|---|---|---|---|---|---|
| Pigment Coated with Resin (Microcapsulated Pigment) | MCP1 (Black) | 6 | | | |
| | MCP2 (Cyan) | | 6 | | |
| | MCP3 (Magenta) | | | 6 | |
| | MCP4 (Yellow) | | | | 6 |
| Glycerol | | 15 | 10 | 10 | 15 |
| Diethylene Glycol | | | 5 | 5 | |
| Trimethylolpropane | | | 6 | 6 | 6 |
| Diethylene Glycol Monobutyl Ether | | 8 | | | |
| 1,3-Dimethyl-2-imidazolidinone | | | | | |
| 2-Pyrrolidone | | | | | |
| Surfynol 465 | | 1 | 1 | 1 | 1 |
| Potassium Hydroxide | | 0.1 | 0.1 | 0.1 | 0.1 |
| Proxel XL-2 | | 0.05 | 0.05 | 0.05 | 0.05 |
| Ion Exchanged Water | | Balance | Balance | Balance | Balance |

TABLE 5

|  |  | Ink 10 | Ink 11 | Ink 12 | Ink 13 | Ink 14 |
|---|---|---|---|---|---|---|
| Pigment Having Hydrophilic Group on Surface | P1 (Black) | 8 | | | | |
| | P2 (Black) | | 6 | | | |
| | P3 (Cyan) | | | 6 | | |
| | P4 (Yellow) | | | | 8 | |
| | P5 (Magenta) | | | | | 10 |
| Glycerol | | 15 | 10 | 10 | 15 | 12 |
| Diethylene Glycol | | | 2 | 2 | | |
| Diethylene Glycol Monobutyl Ether | | 6 | 3 | | 8 | |
| 1,2-Hexanediol | | | 3 | 6 | | 8 |
| Surfynol 465 | | 1 | 1 | 1 | 1 | 1 |
| Polyoxyethylene Nonylphenyl Ether | | | | 0.5 | 0.5 | |
| Potassium Hydroxide | | 0.5 | 0.5 | | | |
| Triethanolamine | | | | 1 | 1 | 1 |
| Proxel XL-2 | | 0.05 | 0.05 | 0.05 | 0.05 | 0.05 |
| Ion Exchanged Water | | Balance | Balance | Balance | Balance | Balance |

Inks 1 to 14 and inks 1' to 9' for ink jet recording obtained above were combined as described in Table 6 shown below to prepare ink sets of Examples 1 to 6 and Comparative Examples 1 to 5.

As for Examples, the ink set was employed in the form of a cartridge based on the color-by-color independent cartridge used in an ink jet printer, PM-950C, manufactured by Seiko Epson Corporation. As an ink jet printer, PM-950C was used. A control circuit of PM-950C as used herein was changed so as to conduct ink jet recording using the self-dispersion type pigment ink, and then to conduct ink jet recording in layers on an image region formed by the self-dispersion type pigment ink, using the light-color resin-containing pigment ink.

A print was made by mounting on PM-950C a total of 6 color inks of the self dispersion type pigment inks (magenta, cyan and yellow inks) and the light-color resin-containing pigment inks (light-color magenta, cyan and yellow inks) and the self dispersion type pigment ink (black ink). Then, the resulting recorded matter was fed to PM-950C again, and the self dispersion type pigment ink (black ink) was changed to the light-color resin-containing pigment ink (black ink) to make a print using only the light-color resin-containing pigment ink (black ink).

On the other hand, as for Comparative Examples, EM-930C manufactured by Seiko Epson Corporation was used as an ink jet printer, and a print was made by applying the ink in the same amount per unit area as with Examples. Further, the ink set was used in the form of a cartridge commercially available for EM-930C use.

Evaluations of recorded matter printed using the ink sets of Examples and Comparative Examples were carried out by the following methods.

The glossiness described below was evaluated only when a print was made on the paper exclusive to ink jet recording.

TABLE 6

|  | Black | | Cyan | | Magenta | | Yellow | |
|---|---|---|---|---|---|---|---|---|
| Example 1 | Ink 1 | Ink 10 | Ink 4 | Ink 12 | Ink 3 | Ink 14 | Ink 5 | Ink 13 |
| Example 2 | Ink 2 | Ink 10 | Ink 4 | Ink 12 | Ink 3 | Ink 14 | Ink 5 | Ink 13 |
| Example 3 | Ink 1 | Ink 11 | Ink 4 | Ink 12 | Ink 3 | Ink 14 | Ink 5 | Ink 13 |
| Example 4 | Ink 2 | Ink 11 | Ink 4 | Ink 12 | Ink 3 | Ink 14 | Ink 5 | Ink 13 |
| Example 5 | Ink 6 | Ink 10 | Ink 7 | Ink 12 | Ink 8 | Ink 14 | Ink 9 | Ink 13 |
| Example 6 | Ink 6 | Ink 11 | Ink 7 | Ink 12 | Ink 8 | Ink 14 | Ink 9 | Ink 13 |
| Comparative Example 1 | Ink 1' | | Ink 4' | | Ink 3' | | Ink 5' | |
| Comparative Example 2 | Ink 2' | | Ink 4' | | Ink 3' | | Ink 5' | |
| Comparative Example 3 | Ink 6' | | Ink 7' | | Ink 8' | | Ink 9' | |
| Comparative Example 4 | | Ink 10 | | Ink 12 | | Ink 14 | | Ink 13 |
| Comparative Example 5 | | Ink 11 | | Ink 12 | | Ink 14 | | Ink 13 |

Evaluation 1: Print Density

A solid print was made at a resolution of 720 dpi/dot and at an ink discharge late of 20 ng/dot on each of Xerox P paper (manufactured by Fuji Xerox Co., Ltd.), plain paper, and PM Photographic Paper (manufactured by Seiko Epson Corporation), paper exclusive to ink jet recording, in a region of 10 mm×10 mm at a duty of 100%. The density of this solid print portion was measured with a spectrophotometer (GRETAGA SPM-50, manufactured by Gretaga Co.). Results obtained were evaluated according to the following criteria:

A: The OD value of the black ink is 1.4 or more.
   The OD value of the color ink is 1.2 or more.
B: The OD value of the black ink is 1.3 to less than 1.4.
   The OD value of the color ink is 1.15 to less than 1.2.
C: The OD value of the black ink is less than 1.3.
   The OD value of the color ink is less than 1.15.

Evaluation 2: Rubbing Resistance

A solid print was made on each of Xerox P paper (manufactured by Fuji Xerox Co., Ltd.), plain paper, and PM Photographic Paper (manufactured by Seiko Epson Corporation), paper exclusive to ink jet recording, in a region of 10 mm×10 mm at a duty of 100%. After standing at a temperature of 25° C. for 1 hour, the above-mentioned printed region was rubbed with a yellow highlight pen using an aqueous ink (ZEBRA PEN2 (trade name), manufactured by Zebra Pen Corporation) at a load of 500 g and at a speed of 10 mm/sec, and it was observed whether a stain occurred or not. Results thereof were evaluated according to the following criteria:

A: No stain occurs when the printed region was rubbed twice.

B: A slight stain occurs when the printed region was rubbed once.

C: A significant stain occurs when the printed region was rubbed once.

Evaluation 3: Glossiness

A solid print was made on PM Photographic Paper (manufactured by Seiko Epson Corporation), paper exclusive to ink jet recording, in a region of 10 mm×10 mm at a duty of 100%. The 60-degree specular glossiness of the printed region was measured with a glossmeter, and evaluated according to the following criteria:

A: The 60-degree specular glossiness is 60 or more.

B: The 60-degree specular glossiness is less than 60.

Evaluation 4: Granular Feeling

The SCID sample "bicycle" of the Japanese Standards Association was printed on PM photographic paper (manufactured by Seiko Epson Corporation) at the recommended setting "fine" of PM-950C in Examples, and at the setting "fine" of EM-930C in Comparative Examples. The resulting samples were evaluated according to the following criteria:

A: No granularity is confirmed at all by visual observation.

B: Granularity is scarcely confirmed by visual observation.

C: Granularity is clearly confirmed by visual observation.

As shown in Table 7, according to the ink sets of Examples 1 to 6 of the invention, excellent results were obtained in all evaluations for both the plain paper and the glossy paper.

On the other hand, when the ink sets of Comparative Examples 1 to 3 comprising only the resin-containing pigment inks were used, sufficient results were not obtained in print density for the plain paper. When the ink sets of Comparative Examples 4 and 5 comprising only the self-dispersion type pigment inks were used, sufficient results were not obtained in rubbing resistance and glossiness.

As described above, according to the ink set for ink jet recording and the ink jet recording process of the invention, good image quality can be easily obtained without depending on the type of paper (particularly, whether paper exclusive to ink jet recording or plain paper).

While the present invention has been described in detail and with reference to specific examples thereof, it will be apparent to one skilled in the art that various changes and modification can be made therein without departing from the spirit and scope thereof.

What is claimed is:

1. An ink set for ink jet recording comprising (a) at least one self-dispersion type pigment ink containing water and a pigment dispersible in water without a dispersing agent and (b) at least one light-color resin-containing pigment ink containing water and a pigment made dispersible in water with a resin, wherein the concentration of the pigment contained in the light-color resin-containing pigment ink is one half or less the concentration of the pigment contained in the self-dispersion type pigment ink, and wherein the pigment in the light-color resin-containing pigment ink is made dispersible by coating the pigment with the resin.

2. The ink set according to claim 1, wherein the at least one self-dispersion type pigment ink is at least one selected from the group consisting of a black ink, a magenta ink, a cyan ink and a yellow ink, and the at least one light-color resin-containing pigment ink is at least one selected from the group consisting of a black ink, a magenta ink, a cyan ink and a yellow ink.

3. The ink set according to claim 1, wherein the ink set is constituted so that the at least one self-dispersion type pigment ink and the at least one light-color resin-containing pigment ink correspond to each other in terms of hue.

TABLE 7

|  | Plain Paper | | | Glossy Paper (Paper Exclusive to Ink Jet Recording) | | | |
| --- | --- | --- | --- | --- | --- | --- | --- |
|  | Evaluation 1 (Print Density) | Evaluation 2 (Rubbing Resistance) | Evaluation 4 (Granular Feeling) | Evaluation 1 (Print Density) | Evaluation 2 (Rubbing Resistance) | Evaluation 3 (Glossiness) | Evaluation 4 (Granular Feeling) |
| Example 1 | A | A | A | A | A | A | A |
| Example 2 | A | A | A | A | A | A | A |
| Example 3 | A | A | A | A | A | A | A |
| Example 4 | A | A | A | A | A | A | A |
| Example 5 | A | A | A | A | A | A | A |
| Example 6 | A | A | A | A | A | A | A |
| Comparative Example 1 | C | A | B | A | A | A | B |
| Comparative Example 2 | C | A | B | A | A | A | B |
| Comparative Example 3 | C | A | B | A | A | A | B |
| Comparative Example 4 | A | B | C | A | C | B | C |
| Comparative Example 5 | A | B | C | A | C | B | C |

4. An ink jet recording process, which comprises the steps of:
   (i) providing an ink set for ink jet recording comprising (a) at least one self-dispersion type pigment ink containing water and a pigment dispersible in water without a dispersing agent and (b) at least one light-color resin-containing pigment ink containing water and a pigment made dispersible in water with a resin, wherein the concentration of the pigment contained in the light-color resin-containing pigment ink is one half or less the concentration of the pigment contained in the self-dispersion type pigment ink;
   (ii) conducting ink jet recording using the self-dispersion type pigment ink, and
   (iii) conducting ink jet recording in layers on an image region formed by the self-dispersion type pigment ink using the light-color resin-containing pigment ink whereby the self-dispersion type pigment ink is overlaid with the light-color resin-containing pigment ink in the same region.

5. The ink jet recording process according to claim 4, wherein the hue of the light-color resin-containing pigment ink and the hue of the self-dispersion type pigment ink overlaid therewith in the same region are conformed to each other.

6. The process according to claim 4, wherein the at least one self-dispersion type pigment ink is at least one selected from the group consisting of a black ink, a magenta ink, a cyan ink and a yellow ink, and the at least one light-color resin-containing pigment ink is at least one selected from the group consisting of a black ink, a magenta ink, a cyan ink and a yellow ink.

7. The process according to claim 4, wherein the ink set is constituted so that the at least one self-dispersion type pigment ink and the at least one light-color resin-containing pigment ink correspond to each other in terms of hue.

8. The process according to claim 4, wherein the pigment in the light-color resin-containing pigment ink is made dispersible with a resin dispersing agent or by coating the pigment with the resin.

* * * * *